US007478150B2

(12) United States Patent
Ueno

(10) Patent No.: US 7,478,150 B2
(45) Date of Patent: Jan. 13, 2009

(54) NETWORK LAYER LINK PROGRAM, NETWORK LAYER LINK APPARATUS, AND NETWORK LAYER LINK METHOD

(75) Inventor: Hitoshi Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 796 days.

(21) Appl. No.: 10/789,242

(22) Filed: Feb. 26, 2004

(65) Prior Publication Data
US 2005/0021691 A1    Jan. 27, 2005

(30) Foreign Application Priority Data
Apr. 1, 2003   (JP) ............................. 2003-098199

(51) Int. Cl.
*G06F 15/173* (2006.01)
(52) U.S. Cl. ...................... 709/223; 709/220
(58) Field of Classification Search ................. 709/220, 709/223, 224
See application file for complete search history.

(56) References Cited

U.S. PATENT DOCUMENTS 6,611,867 B1 * 8/2003 Bowman-Amuah ......... 709/224

FOREIGN PATENT DOCUMENTS

| JP | 2001-036587 | 2/2001 |
| JP | 2002-033767 | 1/2002 |
| JP | 2002-084280 | 3/2002 |

OTHER PUBLICATIONS

Notice of Rejection dated Oct. 3, 2007 from corresponding Japanese application.
"An IP/ATM over WDM system for ultra high speed and quality guaranteed network", Oki Research and Development, Oki Electric Industry Co., Ltd., Apr. 2000, N. 182 (vol. 67, No. 1), pp. 45-78, with partial translation.

* cited by examiner

*Primary Examiner*—Frantz B Jean
(74) *Attorney, Agent, or Firm*—Katten Muchin Rosenman LLP

(57) ABSTRACT

A relationship between first configuration information concerning a configuration of a first network layer and second configuration information concerning a configuration of a second network layer is managed. If there is a change in the configuration, the first configuration information and the second configuration information is automatically updated. For example, when the configuration of the first network layer is changed, the second network layer is instructed to change the configuration of the second network layer.

24 Claims, 36 Drawing Sheets

| # | LINK IDENTIFIER | PATH IDENTIFIER | SETTING STANDARD | NUMBER OF CONNECTIONS |
|---|---|---|---|---|
| 1 | 500 | 400 | STS-3c | 1 |
| 2 | 525 | 420 | STS-12c | 1 |
| 2 | 535 | 420 | STS-12c | 1 |

| # | LINK IDENTIFIER | PRACTICABLE SETTING STANDARD | NUMBER OF CONNECTIONS |
|---|---|---|---|
| 1 | 500 | GbE | 1 |
| 2 | 500 | STS-3c | 1 |
| 3 | 500 | STS-3c | 4 |
| 4 | 500 | STS-3c | 8 |
| 5 | 500 | STS-24c | 1 |

| # | PATH IDENTIFIER | PRACTICABLE SETTING STANDARD | BANDWIDTH |
|---|---|---|---|
| 1 | 400 | STS-3c | 150Mbps |
| 2 | 400 | STS-24c | 1.24Gbps |
| 3 | 410 | STS-3c | 150Mbps |
| 4 | 410 | STS-12c | 622Mbps |

| # | TRANSMISSION STANDARD | LINK/PATH IDENTIFIER | NMS IDENTIFIER |
|---|---|---|---|
| 1 | SECOND TRANSMISSION STANDARD | 400 | 10.20.244.3 |
| 2 | SECOND TRANSMISSION STANDARD | 410 | 10.20.244.3 |
| 2 | FIRST TRANSMISSION STANDARD | 500 | 10.20.244.5 |
| 2 | FIRST TRANSMISSION STANDARD | 525 | 10.20.244.5 |

| # | TRANSMISSION STANDARD | NMS IDENTIFIER |
|---|---|---|
| 1 | SECOND TRANSMISSION STANDARD | 10.20.244.3 |
| 2 | SECOND TRANSMISSION STANDARD | 10.20.244.14 |
| 3 | FIRST TRANSMISSION STANDARD | 10.20.244.5 |

| # | LINK IDENTIFIER | PATH IDENTIFIER | SETTING STANDARD | NUMBER OF CONNECTIONS |
|---|---|---|---|---|
| 1 | 500 | 400 | STS-3c | 1 |
| 2 | 525 | 420 | STS-12c | 1 |
| 2 | 535 | 420 | STS-12c | 1 |

1202

| # | LINK IDENTIFIER | PRACTICABLE SETTING STANDARD | NUMBER OF CONNECTIONS |
|---|---|---|---|
| 1 | 500 | GbE | 1 |
| 2 | 500 | STS-3c | 1 |
| 3 | 500 | STS-3c | 4 |
| 4 | 500 | STS-3c | 8 |
| 5 | 500 | STS-24c | 1 |

1203

| # | PATH IDENTIFIER | PRACTICABLE SETTING STANDARD | BANDWIDTH |
|---|---|---|---|
| 1 | 400 | STS-3c | 150Mbps |
| 2 | 400 | STS-24c | 1.24Gbps |
| 3 | 410 | STS-3c | 150Mbps |
| 4 | 410 | STS-12c | 622Mbps |

1204

| # | TRANSMISSION STANDARD | LINK/PATH IDENTIFIER | NMS IDENTIFIER |
|---|---|---|---|
| 1 | SECOND TRANSMISSION STANDARD | 400 | 10.20.244.3 |
| 2 | SECOND TRANSMISSION STANDARD | 410 | 10.20.244.3 |
| 2 | FIRST TRANSMISSION STANDARD | 500 | 10.20.244.5 |
| 2 | FIRST TRANSMISSION STANDARD | 525 | 10.20.244.5 |

| # | LINK IDENTIFIER | PATH IDENTIFIER | SETTING STANDARD | NUMBER OF CONNECTIONS |
|---|---|---|---|---|
| 1 | 500 | 400 | STS-3c | 4 |
| 2 | 525 | 420 | STS-12c | 1 |
| 2 | 535 | 420 | STS-12c | 1 |

1202

| # | LINK IDENTIFIER | PRACTICABLE SETTING STANDARD | NUMBER OF CONNECTIONS |
|---|---|---|---|
| 1 | 500 | GbE | 1 |
| 2 | 500 | STS-3c | 1 |
| 3 | 500 | STS-3c | 4 |
| 4 | 500 | STS-3c | 8 |
| 5 | 500 | STS-24c | 1 |

1203

| # | PATH IDENTIFIER | PRACTICABLE SETTING STANDARD | BANDWIDTH |
|---|---|---|---|
| 1 | 400 | STS-3c | 150Mbps |
| 2 | 400 | STS-24c | 1.24Gbps |
| 3 | 420 | STS-3c | 150Mbps |
| 4 | 420 | STS-12c | 622Mbps |

1204

| # | TRANSMISSION STANDARD | LINK/PATH IDENTIFIER | NMS IDENTIFIER |
|---|---|---|---|
| 1 | SECOND TRANSMISSION STANDARD | 400 | 10.20.244.3 |
| 2 | SECOND TRANSMISSION STANDARD | 410 | 10.20.244.3 |
| 2 | FIRST TRANSMISSION STANDARD | 500 | 10.20.244.5 |
| 2 | FIRST TRANSMISSION STANDARD | 525 | 10.20.244.5 |

| # | LINK IDENTIFIER | PATH IDENTIFIER | SETTING STANDARD | NUMBER OF CONNECTIONS |
|---|---|---|---|---|

1202

| # | LINK IDENTIFIER | PRACTICABLE SETTING STANDARD | NUMBER OF CONNECTIONS |
|---|---|---|---|
| 1 | 525 | GbE | 1 |

1203

| # | PATH IDENTIFIER | PRACTICABLE SETTING STANDARD | BANDWIDTH |
|---|---|---|---|
| 1 | 410 | STS-3c | 150Mbps |
| 2 | 410 | STS-12c | 622Mbps |

1204

| # | TRANSMISSION STANDARD | LINK/PATH IDENTIFIER | NMS IDENTIFIER |
|---|---|---|---|
| 1 | SECOND TRANSMISSION STANDARD | 410 | 10.20.244.3 |
| 2 | FIRST TRANSMISSION STANDARD | 525 | 10.20.244.5 |

1205

| # | TRANSMISSION STANDARD | NMS IDENTIFIER |
|---|---|---|
| 1 | SECOND TRANSMISSION STANDARD | 10.20.244.3 |
| 2 | SECOND TRANSMISSION STANDARD | 10.20.244.14 |
| 3 | FIRST TRANSMISSION STANDARD | 10.20.244.5 |

| # | LINK IDENTIFIER | PATH IDENTIFIER | SETTING STANDARD | NUMBER OF CONNECTIONS |
|---|---|---|---|---|
| 1 | 500 | 400 | STS-3c | 1 |

1202

| # | LINK IDENTIFIER | PRACTICABLE SETTING STANDARD | NUMBER OF CONNECTIONS |
|---|---|---|---|
| 1 | 500 | GbE | 1 |
| 2 | 500 | STS-3c | 1 |
| 3 | 500 | STS-3c | 4 |
| 4 | 500 | STS-3c | 8 |
| 5 | 500 | STS-24c | 1 |
| 6 | 525 | GbE | 1 |

1203

| # | PATH IDENTIFIER | PRACTICABLE SETTING STANDARD | BANDWIDTH |
|---|---|---|---|
| 1 | 400 | STS-3c | 150Mbps |
| 2 | 400 | STS-24c | 1.24Gbps |
| 3 | 410 | STS-3c | 150Mbps |
| 4 | 410 | STS-12c | 622Mbps |

1204

| # | TRANSMISSION STANDARD | LINK/PATH IDENTIFIER | NMS IDENTIFIER |
|---|---|---|---|
| 1 | SECOND TRANSMISSION STANDARD | 400 | 10.20.244.3 |
| 2 | SECOND TRANSMISSION STANDARD | 410 | 10.20.244.3 |
| 3 | FIRST TRANSMISSION STANDARD | 500 | 10.20.244.5 |
| 4 | FIRST TRANSMISSION STANDARD | 525 | 10.20.244.5 |

1205

| # | TRANSMISSION STANDARD | NMS IDENTIFIER |
|---|---|---|
| 1 | SECOND TRANSMISSION STANDARD | 10.20.244.3 |
| 2 | SECOND TRANSMISSION STANDARD | 10.20.244.14 |
| 3 | FIRST TRANSMISSION STANDARD | 10.20.244.5 |

| # | LINK IDENTIFIER | PATH IDENTIFIER | SETTING STANDARD | NUMBER OF CONNECTIONS |
|---|---|---|---|---|
| 1 | 500 | 400 | STS-3c | 1 |

1202

| # | LINK IDENTIFIER | PRACTICABLE SETTING STANDARD | NUMBER OF CONNECTIONS |
|---|---|---|---|
| 1 | 500 | GbE | 1 |
| 2 | 500 | STS-3c | 1 |
| 3 | 500 | STS-3c | 4 |
| 4 | 500 | STS-3c | 8 |
| 5 | 500 | STS-24c | 1 |

1203

| # | PATH IDENTIFIER | PRACTICABLE SETTING STANDARD | BANDWIDTH |
|---|---|---|---|
| 1 | 400 | STS-3c | 150Mbps |
| 2 | 400 | STS-24c | 1.24Gbps |
| 3 | 410 | STS-3c | 150Mbps |
| 4 | 410 | STS-12c | 622Mbps |

1204

| # | TRANSMISSION STANDARD | LINK/PATH IDENTIFIER | NMS IDENTIFIER |
|---|---|---|---|
| 1 | SECOND TRANSMISSION STANDARD | 400 | 10.20.244.3 |
| 2 | SECOND TRANSMISSION STANDARD | 410 | 10.20.244.14 |
| 3 | FIRST TRANSMISSION STANDARD | 500 | 10.20.244.5 |
| 4 | FIRST TRANSMISSION STANDARD | 525 | 10.20.244.5 |

| # | LINK IDENTIFIER | PATH IDENTIFIER | SETTING STANDARD | NUMBER OF CONNECTIONS |
|---|---|---|---|---|

1202

| # | LINK IDENTIFIER | PRACTICABLE SETTING STANDARD | NUMBER OF CONNECTIONS |
|---|---|---|---|
| 1 | 525 | GbE | 1 |

1203

| # | PATH IDENTIFIER | PRACTICABLE SETTING STANDARD | BANDWIDTH |
|---|---|---|---|
| 3 | 410 | STS-3c | 150Mbps |
| 4 | 410 | STS-12c | 622Mbps |

1204

| # | TRANSMISSION STANDARD | LINK/PATH IDENTIFIER | NMS IDENTIFIER |
|---|---|---|---|
| 1 | SECOND TRANSMISSION STANDARD | 410 | 10.20.244.14 |
| 2 | FIRST TRANSMISSION STANDARD | 525 | 10.20.244.5 |

| # | PATH IDENTIFIER | SUB-PATH IDENTIFIER | SETTING STANDARD | NUMBER OF CONNECTIONS |
|---|---|---|---|---|
| 1 | 400 | 410 | STS-3c | 1 |
| 2 | 400 | 415 | STS-3c | 1 |

| # | LINK IDENTIFIER | PATH IDENTIFIER | SETTING STANDARD | NUMBER OF CONNECTIONS |
|---|---|---|---|---|
| 1 | 500 | 400 | STS-3c | 1 |

1202

| # | LINK IDENTIFIER | PRACTICABLE SETTING STANDARD | NUMBER OF CONNECTIONS |
|---|---|---|---|
| 1 | 500 | GbE | 1 |
| 2 | 500 | STS-3c | 1 |
| 3 | 500 | STS-3c | 4 |
| 4 | 500 | STS-24c | 8 |
| 5 | 500 | STS-24c | 1 |

1203

| # | PATH IDENTIFIER | PRACTICABLE SETTING STANDARD | BANDWIDTH |
|---|---|---|---|
| 1 | 400 | — | — |
| 2 | 410 | STS-3c | 150Mbps |
| 3 | 410 | STS-24c | 1.24Gbps |
| 4 | 415 | STS-3c | 150Mbps |
| 5 | 415 | STS-12c | 622Mbps |

1204

| # | TRANSMISSION STANDARD | LINK/PATH IDENTIFIER | NMS IDENTIFIER |
|---|---|---|---|
| 1 | FIRST TRANSMISSION STANDARD | 400 | 10.20.244.3 |
| 2 | FIRST TRANSMISSION STANDARD | 410 | 10.20.244.3 |
| 3 | FIRST TRANSMISSION STANDARD | 415 | 10.20.244.14 |
| 4 | SECOND TRANSMISSION STANDARD | 500 | 10.20.244.5 |
| 5 | SECOND TRANSMISSION STANDARD | 525 | 10.20.244.5 |

1206

| # | PATH IDENTIFIER | SUB-PATH IDENTIFIER | SETTING STANDARD | NUMBER OF CONNECTIONS |
|---|---|---|---|---|
| 1 | 400 | 410 | STS-3c | 1 |
| 2 | 400 | 415 | STS-3c | 1 |

| # | LINK IDENTIFIER | PATH IDENTIFIER | SETTING STANDARD | NUMBER OF CONNECTIONS |
|---|---|---|---|---|
| 1 | 500 | 400 | STS-3c | 4 |

1202

| # | LINK IDENTIFIER | PRACTICABLE SETTING STANDARD | NUMBER OF CONNECTIONS |
|---|---|---|---|
| 1 | 500 | GbE | 1 |
| 2 | 500 | STS-3c | 1 |
| 3 | 500 | STS-3c | 4 |
| 4 | 500 | STS-3c | 8 |
| 5 | 500 | STS-24c | 1 |

1203

| # | PATH IDENTIFIER | PRACTICABLE SETTING STANDARD | BANDWIDTH |
|---|---|---|---|
| 1 | 400 | — | — |
| 2 | 410 | STS-3c | 150Mbps |
| 3 | 410 | STS-24c | 1.24Gbps |
| 4 | 415 | STS-3c | 150Mbps |
| 5 | 415 | STS-12c | 622Mbps |

1204

| # | TRANSMISSION STANDARD | LINK/PATH IDENTIFIER | NMS IDENTIFIER |
|---|---|---|---|
| 1 | FIRST TRANSMISSION STANDARD | 400 | 10.20.244.3 |
| 2 | FIRST TRANSMISSION STANDARD | 410 | 10.20.244.3 |
| 3 | FIRST TRANSMISSION STANDARD | 415 | 10.20.244.14 |
| 4 | SECOND TRANSMISSION STANDARD | 500 | 10.20.244.5 |
| 5 | SECOND TRANSMISSION STANDARD | 525 | 10.20.244.5 |

1206

| # | PATH IDENTIFIER | SUB-PATH IDENTIFIER | SETTING STANDARD | NUMBER OF CONNECTIONS |
|---|---|---|---|---|
| 1 | 400 | 410 | STS-3c | 4 |
| 2 | 400 | 415 | STS-3c | 4 |

| # | SERVICE IDENTIFIER | LINK IDENTIFIER | STATUS |
|---|---|---|---|

| # | SERVICE IDENTIFIER | LINK IDENTIFIER | STATUS |
|---|---|---|---|
| 1 | 600 | 500 | IN-SERVICE |
| 2 | 600 | 501 | IN-SERVICE |

| # | SERVICE IDENTIFIER | STATUS | REQUIRED QUALITY (COMMUNICATION WAITING TIME) |
|---|---|---|---|

| # | SERVICE IDENTIFIER | STATUS | REQUIRED QUALITY (COMMUNICATION WAITING TIME) |
|---|---|---|---|
| 1 | 600 | IN-SERVICE | 15 MINUTES |

| # | LINK IDENTIFIER | PATH IDENTIFIER | SETTING STANDARD | NUMBER OF CONNECTIONS |
|---|---|---|---|---|
| 1 | 500 | 400 | STS-3c | 1 |

1202

| # | LINK IDENTIFIER | PRACTICABLE SETTING STANDARD | NUMBER OF CONNECTIONS |
|---|---|---|---|
| 1 | 500 | GbE | 1 |
| 2 | 500 | STS-3c | 1 |
| 3 | 500 | STS-3c | 4 |
| 4 | 500 | STS-3c | 8 |
| 5 | 500 | STS-24c | 1 |

1203

| # | PATH IDENTIFIER | PRACTICABLE SETTING STANDARD | BANDWIDTH |
|---|---|---|---|
| 1 | 400 | STS-3c | 150Mbps |
| 2 | 400 | STS-24c | 1.24Gbps |
| 3 | 410 | STS-3c | 150Mbps |
| 4 | 410 | STS-12c | 622Mbps |

1204

| # | TRANSMISSION STANDARD | LINK/PATH IDENTIFIER | NMS IDENTIFIER |
|---|---|---|---|
| 1 | FIRST TRANSMISSION STANDARD | 400 | 10.20.244.3 |
| 2 | FIRST TRANSMISSION STANDARD | 410 | 10.20.244.14 |
| 3 | SECOND TRANSMISSION STANDARD | 500 | 10.20.244.5 |
| 4 | SECOND TRANSMISSION STANDARD | 525 | 10.20.244.5 |

1207

| # | SERVICE IDENTIFIER | LINK IDENTIFIER | STATUS |
|---|---|---|---|
| 1 | 600 | 500 | OUT OF SERVICE |
| 2 | 600 | 501 | OUT OF SERVICE |

| # | LINK IDENTIFIER | PATH IDENTIFIER | SETTING STANDARD | NUMBER OF CONNECTIONS |
|---|---|---|---|---|

1202

| # | LINK IDENTIFIER | PRACTICABLE SETTING STANDARD | NUMBER OF CONNECTIONS |
|---|---|---|---|
| 1 | 525 | GbE | 1 |

1203

| # | PATH IDENTIFIER | PRACTICABLE SETTING STANDARD | BANDWIDTH |
|---|---|---|---|
| 3 | 410 | STS-3c | 150Mbps |
| 4 | 410 | STS-12c | 622Mbps |

1204

| # | TRANSMISSION STANDARD | LINK/PATH IDENTIFIER | NMS IDENTIFIER |
|---|---|---|---|
| 1 | FIRST TRANSMISSION STANDARD | 410 | 10.20.244.14 |
| 2 | SECOND TRANSMISSION STANDARD | 525 | 10.20.244.5 |

1207

| # | SERVICE IDENTIFIER | LINK IDENTIFIER | STATUS |
|---|---|---|---|

FIG.37

1201
| # | LINK IDENTIFIER | PATH IDENTIFIER | SETTING STANDARD | NUMBER OF CONNECTIONS |
|---|---|---|---|---|
| 1 | 500 | 400 | STS-3c | 1 |

1202
| # | LINK IDENTIFIER | PRACTICABLE SETTING STANDARD | NUMBER OF CONNECTIONS |
|---|---|---|---|
| 1 | 500 | GbE | 1 |
| 2 | 500 | STS-3c | 1 |
| 3 | 500 | STS-3c | 4 |
| 4 | 500 | STS-3c | 8 |
| 5 | 500 | STS-24c | 1 |

1203
| # | PATH IDENTIFIER | PRACTICABLE SETTING STANDARD | BANDWIDTH |
|---|---|---|---|
| 1 | 400 | STS-3c | 150Mbps |
| 2 | 400 | STS-24c | 1.24Gbps |
| 3 | 410 | STS-3c | 150Mbps |
| 4 | 410 | STS-12c | 622Mbps |

1204
| # | TRANSMISSION STANDARD | LINK/PATH IDENTIFIER | NMS IDENTIFIER |
|---|---|---|---|
| 1 | FIRST TRANSMISSION STANDARD | 400 | 10.20.244.3 |
| 2 | FIRST TRANSMISSION STANDARD | 410 | 10.20.244.14 |
| 3 | SECOND TRANSMISSION STANDARD | 500 | 10.20.244.5 |
| 4 | SECOND TRANSMISSION STANDARD | 525 | 10.20.244.5 |

1207
| # | SERVICE IDENTIFIER | LINK IDENTIFIER | STATUS |
|---|---|---|---|
| 1 | 600 | 500 | IN-SERVICE |
| 2 | 600 | 501 | IN-SERVICE |

1208
| # | SERVICE IDENTIFIER | STATUS | REQUIRED QUALITY (COMMUNICATION WAITING TIME) |
|---|---|---|---|
| 1 | 600 | IN-SERVICE | 15 MINUTES |

| # | LINK IDENTIFIER | PATH IDENTIFIER | SETTING STANDARD | NUMBER OF CONNECTIONS |
|---|---|---|---|---|
| 1 | 500 | 400 | STS-3c | 1 |

1202

| # | LINK IDENTIFIER | PRACTICABLE SETTING STANDARD | NUMBER OF CONNECTIONS |
|---|---|---|---|
| 1 | 500 | GbE | 1 |
| 2 | 500 | STS-3c | 1 |
| 3 | 500 | STS-3c | 4 |
| 4 | 500 | STS-3c | 8 |
| 5 | 500 | STS-24c | 1 |

1203

| # | PATH IDENTIFIER | PRACTICABLE SETTING STANDARD | BANDWIDTH |
|---|---|---|---|
| 1 | 400 | STS-3c | 150Mbps |
| 2 | 400 | STS-24c | 1.24Gbps |
| 3 | 410 | STS-3c | 150Mbps |
| 4 | 410 | STS-12c | 622Mbps |

1204

| # | TRANSMISSION STANDARD | LINK/PATH IDENTIFIER | NMS IDENTIFIER |
|---|---|---|---|
| 1 | FIRST TRANSMISSION STANDARD | 400 | 10.20.244.3 |
| 2 | FIRST TRANSMISSION STANDARD | 410 | 10.20.244.14 |
| 3 | SECOND TRANSMISSION STANDARD | 500 | 10.20.244.5 |
| 4 | SECOND TRANSMISSION STANDARD | 525 | 10.20.244.5 |

1207

| # | SERVICE IDENTIFIER | LINK IDENTIFIER | STATUS |
|---|---|---|---|
| 1 | 600 | 500 | IN-SERVICE |
| 2 | 600 | 501 | IN-SERVICE |

1208

| # | SERVICE IDENTIFIER | STATUS | REQUIRED QUALITY (COMMUNICATION WAITING TIME) |
|---|---|---|---|
| 1 | 600 | FAIL 10:20 | 15 MINUTES |

NETWORK LAYER LINK PROGRAM, NETWORK LAYER LINK APPARATUS, AND NETWORK LAYER LINK METHOD

BACKGROUND OF THE INVENTION

1) Field of the Invention

The present invention relates to a computer program, a network layer link apparatus, and a network layer link method that use different transmission standards.

2) Description of the Related Art

FIG. 40 is a block diagram of a system configuration of a conventional hierarchical network. A first transmitter $10_1$ and a first transmitter $10_2$ transmit packets at a link L500 based on a first transmission standard (for example, a prescription concerning a local area network (LAN) that is standardized by the IEEE802 committee).

A first element management system (EMS) $20_1$ directly manages the first transmitter $10_1$ concerning a restart, and a setting and a cancellation of a link. A first EMS $20_2$ also directly manages the first transmitter $10_2$ concerning a restart, and a setting and a cancellation of a link, like the first EMS $20_1$.

A first NMS 30 is a host system of the first EMS $20_1$ and the first EMS $20_2$. The network manager operates the first NMS 30. The first NMS 30 makes the first EMS $20_1$ and the first EMS $20_2$ execute the management of the first transmitter $10_1$ and the first transmitter $10_2$, based on a command from the network manager.

The first transmitter $10_1$, the first transmitter $10_2$, the first EMS $20_1$, the first EMS $20_2$, and the first NMS 30 belong to a first layer.

On the other hand, a second transmitter $40_1$ and a second transmitter $40_2$ are used when the first transmitter $10_1$ and the first transmitter $10_2$ are geographically separated far from each other and when these transmitters use a packet. The second transmitter $40_1$ and the second transmitter $40_2$ are provided between the first transmitter $10_1$ and the first transmitter $10_2$.

The second transmitter $40_1$ and the second transmitter $40_2$ provide a path (i.e., a path P400 in FIG. 40) that passes through a plurality of node using a second transmission standard (for example, a synchronous optical network (SONET)). The first transmitter $10_1$ and the first transmitter $10_2$ utilize the path P400 provided by the second transmitter $40_1$ and the second transmitter $40_2$ as one virtual physical link (i.e., a link L500 in FIG. 4).

The first transmitter $10_1$, the second transmitter $40_1$, the second transmitter $40_2$, and the first transmitter $10_2$ are connected via a physical network 70.

A second EMS $50_1$ directly manages the second transmitter $40_1$ the second transmitter $40_2$ concerning a restart, and a setting and a cancellation of a path. A second NMS 60 is a host system of the second EMS $50_1$. The network manager operates this second NMS 60. The second NMS 60 makes the second EMS $50_1$ manage the second transmitter $40_1$ and the second transmitter $40_2$, based on a command from the network manager.

The second transmitter $40_1$, the second transmitter $40_2$, the second EMS $50_1$, and the second NMS 60 belong to a second layer. As the first layer and the second layer are not mutually linked, these layers are operated independently.

As explained above, conventionally, the first layer at the first NMS 30 side corresponding to the first transmission standard is not linked with the second layer at the second NMS 60 side corresponding to the second transmission standard. Therefore, the load of the network manage is large.

Consequently, the network manager is forced to carry out a complex operation. The network manager must investigate about a cross relationship between the link and the path. Then, the network manager must set the path at the second NMS 60 after setting the link at the first NMS 30, based on the understanding about specifications of the first transmitter 101 and the first transmitter 102 and specifications of the second transmitter 401 and the second transmitter 402.

Japanese Patent Application Laid-open Nos. 2002-33767, 2001-36587, and Japanese Patent Application Laid-open No. 2002-84280 disclose related art.

SUMMARY OF THE INVENTION

It is an object of the present invention to solve at least the problems in the conventional technology.

A network layer link apparatus according to an aspect of the present invention includes a managing unit that manages a relationship between first configuration information concerning a configuration of a first network layer and second configuration information concerning a configuration of a second network layer, and automatically updates the first configuration information and the second configuration information following a change in the configuration; and a link unit that, when the configuration of the first network layer is changed, instructs the second network layer to change the configuration of the second network layer.

A network layer link method according to another aspect of the present invention includes managing a relationship between first configuration information concerning a configuration of a first network layer and second configuration information concerning a configuration of a second network layer, and automatically updates the first configuration information and the second configuration information following a change in the configuration; and instructing the second network layer, when the configuration of the first network layer is changed, to change the configuration of the second network layer.

A computer program according to still another aspect of the present invention realizes on a computer the method according to the above aspect.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 4 illustrates a table $120_1$ shown in FIG. 3;
FIG. 5 illustrates a table $120_2$ shown in FIG. 3;
FIG. 6 illustrates a table $120_3$ shown in FIG. 3;
FIG. 7 illustrates a table $120_4$ shown in FIG. 3;
FIG. 8 illustrates a table $120_5$ shown in FIG. 3;

FIG. 13 illustrates tables that express a state before executing the link bandwidth setting processing;

FIG. 14 illustrates tables that express a state after executing the link bandwidth setting processing;

FIG. 16 illustrates tables that express a state before executing the table registration processing;

FIG. 17 illustrates tables that express a state after executing the table registration processing;

FIG. 18 illustrates tables that express a state before executing the table delete processing;

FIG. 19 illustrates tables that express a state after executing the table delete processing;

FIG. 22 illustrates a table $120_6$;

FIG. 24 illustrates tables that express a state before executing the link bandwidth setting processing;

FIG. 25 illustrates tables that express a state after executing the link bandwidth setting processing;

FIGS. 32A and 32B illustrate a table $120_7$ before and after executing a first registration processing according to the third embodiment;

FIGS. 33A and 33B illustrate a table $120_8$ before and after executing a second registration processing according to the third embodiment;

FIG. 34 illustrates tables that express a state before executing the delete processing according to the third embodiment;

FIG. 34 illustrates tables that express a state after executing the delete processing according to the third embodiment;

FIG. 37 illustrates tables that express a state before executing the trouble notification processing according to the third embodiment;

FIG. 37 illustrates tables that express a state after executing the trouble notification processing according to the third embodiment;

DETAILED DESCRIPTION

Exemplary embodiments of a computer program, a network layer link apparatus, and a network layer link method according to the present invention will be explained in detail below with reference to the accompanying drawings.

Figure 1:
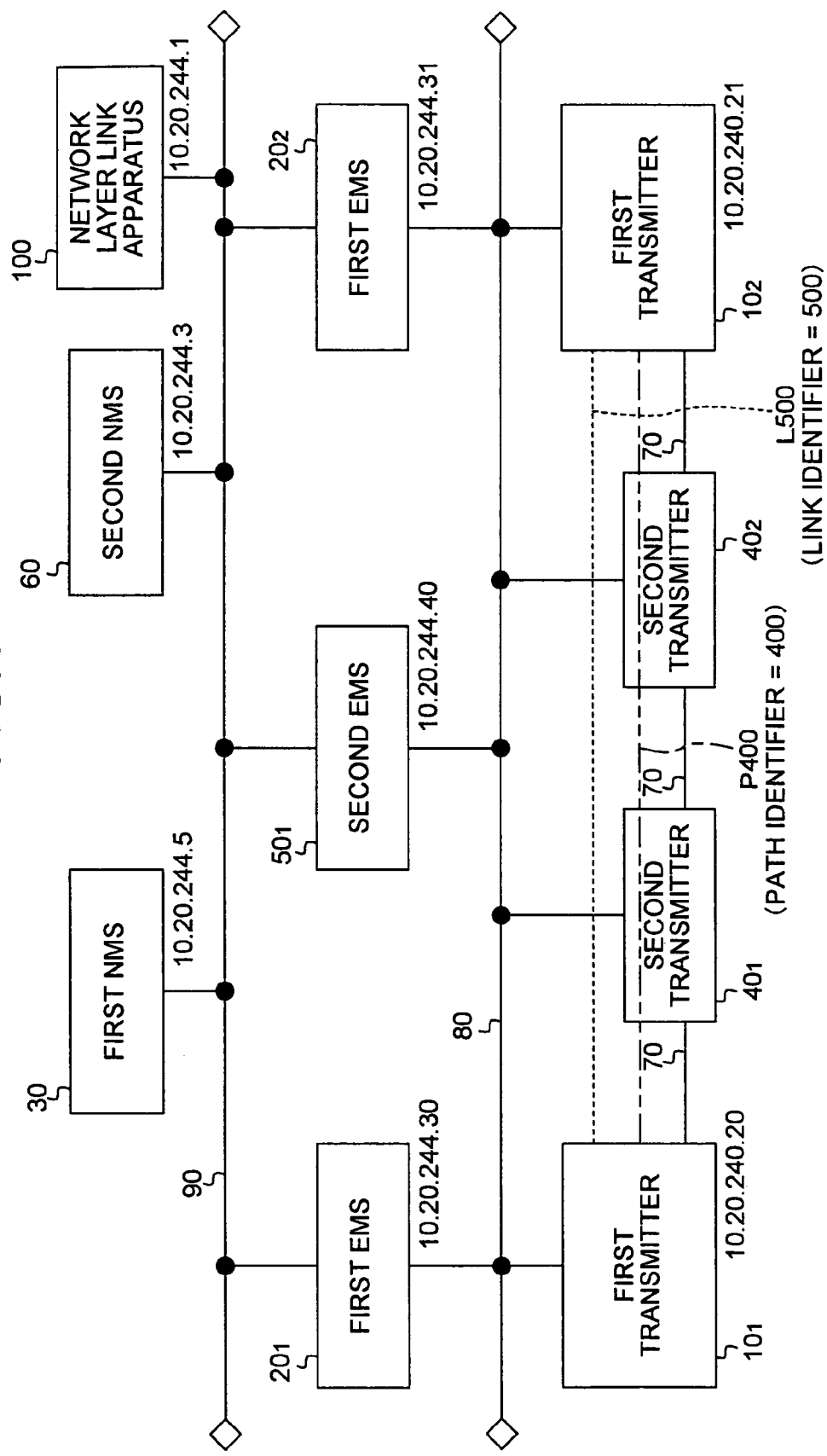
FIG. 1 is a block diagram of a configuration of a network system according to a first embodiment of the present invention.
Figure 2:
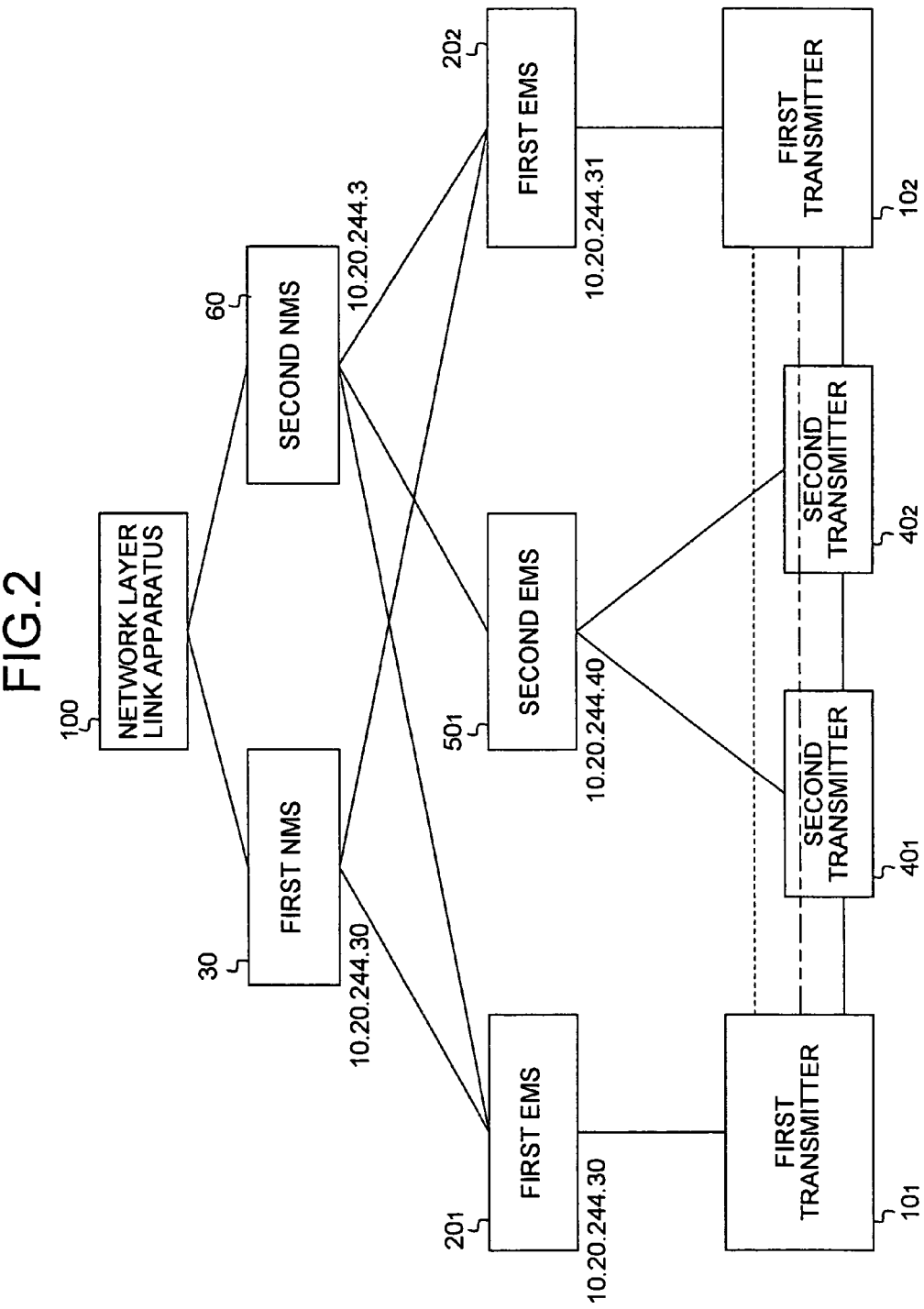
FIG. 2 is a block diagram of an interlayer configuration of each section of the network system.
Figure 40:
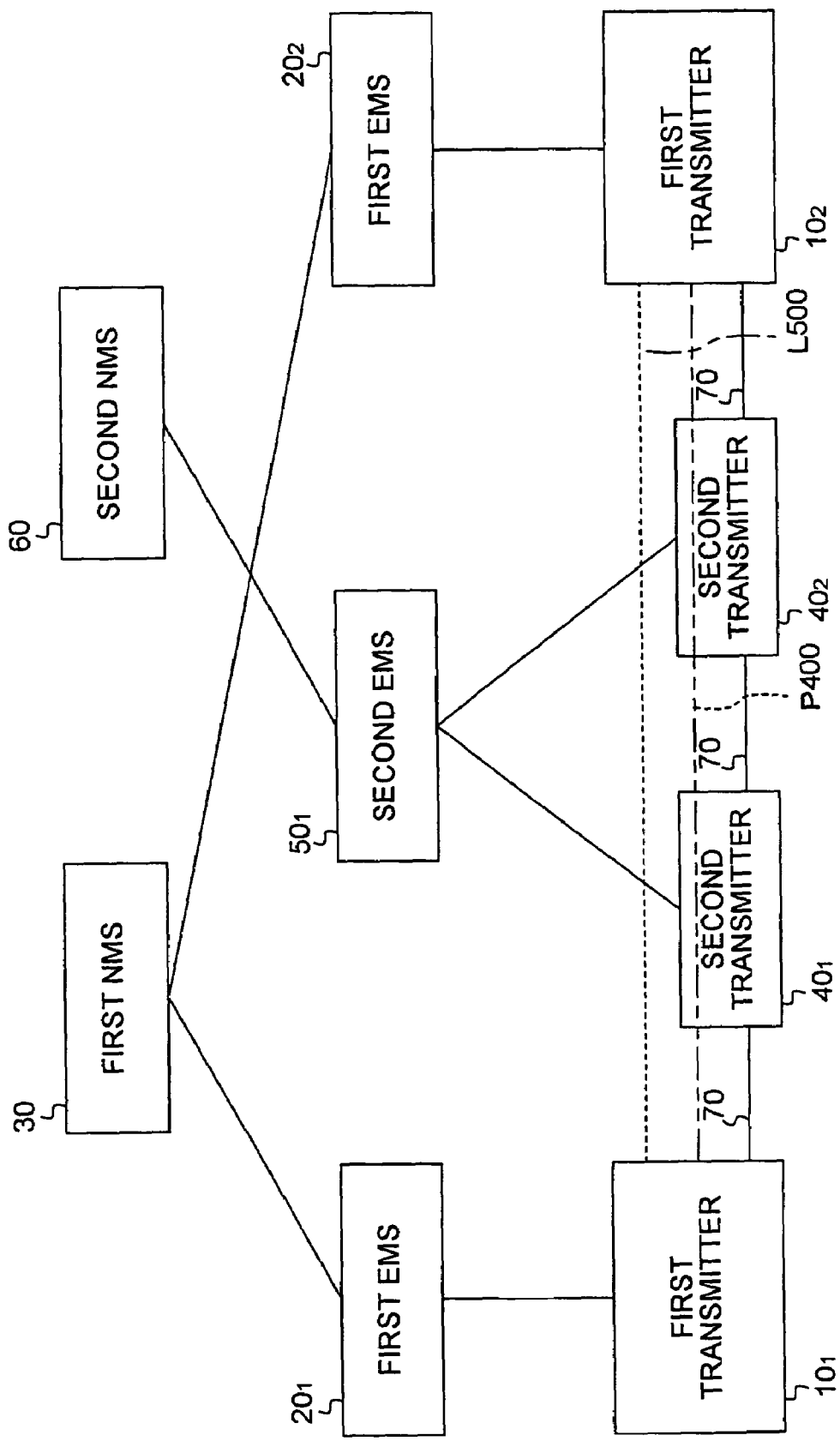
FIG. 40 is a block diagram of a configuration of a conventional hierarchical network system.

FIG. 1 is a block diagram of a configuration of a network system according to a first embodiment of the present invention. FIG. 2 is a block diagram of an interlayer configuration of each section of the network system according to the first embodiment. In FIG. 1 and FIG. 2, structural elements that have same or similar configuration or that perform same or similar functions as the structural elements shown in FIG. 40, have been designated with like reference numerals.

In the network system according to a first embodiment, a network layer link apparatus 100 has been provided newly. Internet Protocol (IP) addresses 10.20.240.20, 10.20.240.21, 10.20.244.30, 10.20.244.31, 10.20.244.5, 10.20.244.40, 10.20.244.3, and 10.20.244.1 are provided to the first transmitter $10_1$, the first transmitter $10_2$, the first EMS $20_1$, the first EMS $20_2$, the first NMS 30, the second EMS $50_1$, the second NMS 60, and the network layer link apparatus 100 respectively.

The IP address (10.20.244.5) that is given to the first NMS 30 and the IP address (10.20.244.3) that is given to the second NMS 60 are called NMS identifiers respectively.

A management network 80 is connected to the first transmitter $10_1$, the first transmitter $10_2$, the first EMS $20_1$, the first EMS $20_2$, the second transmitter $40_1$, the second transmitter $40_2$, and the second EMS $60_1$ respectively.

A management network 90 is connected to the first EMS $20_1$, the first EMS $20_2$, the first NMS 30, the second EMS $50_1$, the second NMS 60, and the network layer link apparatus 100 respectively.

The second NMS 60 shown in FIG. 2 can access the first EMS $20_1$ and the first EMS $20_2$, in addition to the second EMS $50_1$.

Figure 3:
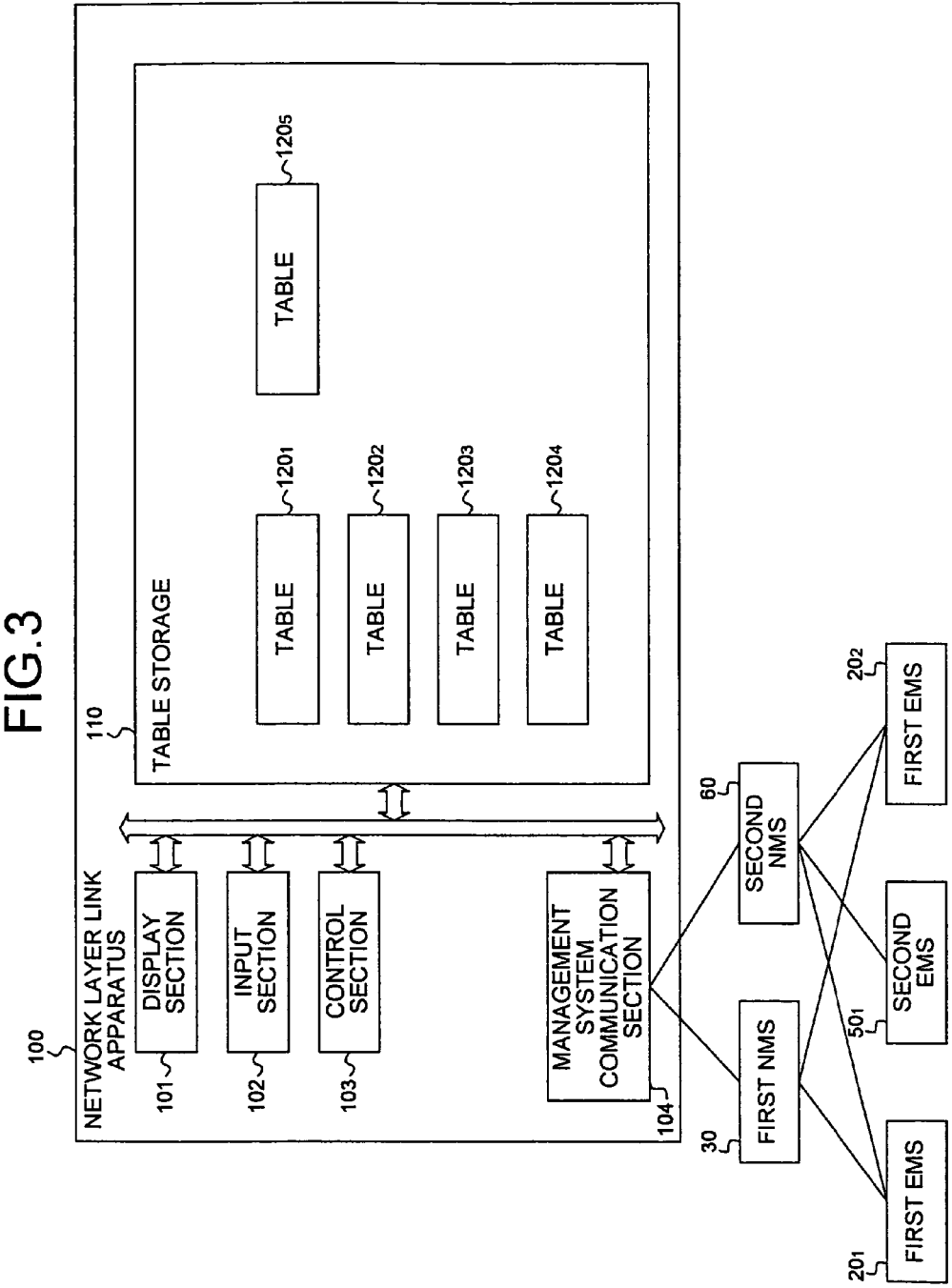
FIG. 3 is a block diagram of a configuration of a network layer link apparatus.

The network layer link apparatus 100 links between the first layer (first transmission standard) at the first NMS 30 side and the second layer (second transmission standard) at the second NMS 60 side. FIG. 3 is a block diagram of a configuration of a network layer link apparatus 100 shown in FIG. 1 and FIG. 2.

In the network layer link apparatus 10 shown in FIG. 3, a display section 101 has a function of displaying various kinds of information to a network manager. An input section 102 includes a keyboard and a mouse, and is used to input various kinds of information. A control section 103 executes various kinds of control to achieve the above link. A detailed operation of the control section 103 will be explained later. A management system communication section 104 controls communications between the first NMS 30 and the second NMS 60.

A table storage 110 stores tables $120_1$ to $120_5$. The tables $120_1$ to $120_5$ will be explained with reference to FIG. 4 to FIG. 8.

The table $120_1$ has fields called "link identifier", "path identifier", "setting standard", and "number of connections". The "link identifier" identifies links that are set by the first transmitter $10_1$ and the first transmitter $10_2$.

The "path identifier" identifies paths that are set by the second transmitter $40_1$ and the second transmitter $40_2$. The "setting standard" is used to execute the above setting. The "number of connections" expresses a number of transmission lines having a predetermined bandwidth at the time of constructing one link and one path.

A table $120_2$ shown in FIG. 5 has fields called "link identifier", "practicable setting standard", and "number of connections". The "link identifier" identifies links that can be set in the first transmitter $10_1$ and the first transmitter $10_2$. The "practicable setting standard" expresses a setting standard that can be used for the link. The "number of connections"

expresses a number of transmission lines having a predetermined bandwidth at the time of constructing one link.

A table $120_3$ shown in FIG. 6 has fields that are called "path identifier", "practicable setting standard", and "bandwidth". The "path identifier" identifies paths that can be set in the second transmitter $40_1$ and the second transmitter $40_2$. The "practicable setting standard" expresses a setting standard that can be used for the path. The "bandwidth" expresses a bandwidth of the path.

A table $120_4$ shown in FIG. 7 has fields that are called "transmission standard", "link/path identifier", and "NMS identifier". The "transmission standard" expresses the first transmission standard or the second transmission standard. The "link/path identifier" expresses a link identifier or a path identifier. The "NMS identifier" identifies the first NMS 30 or the second NMS 60.

A table $120_5$ shown in FIG. 8 has fields that are called "transmission standard", and "NMS identifier". The "transmission standard" expresses the first transmission standard or the second transmission standard. The "NMS identifier" identifies the first NMS 30 or the second NMS 60.

Figure 9:
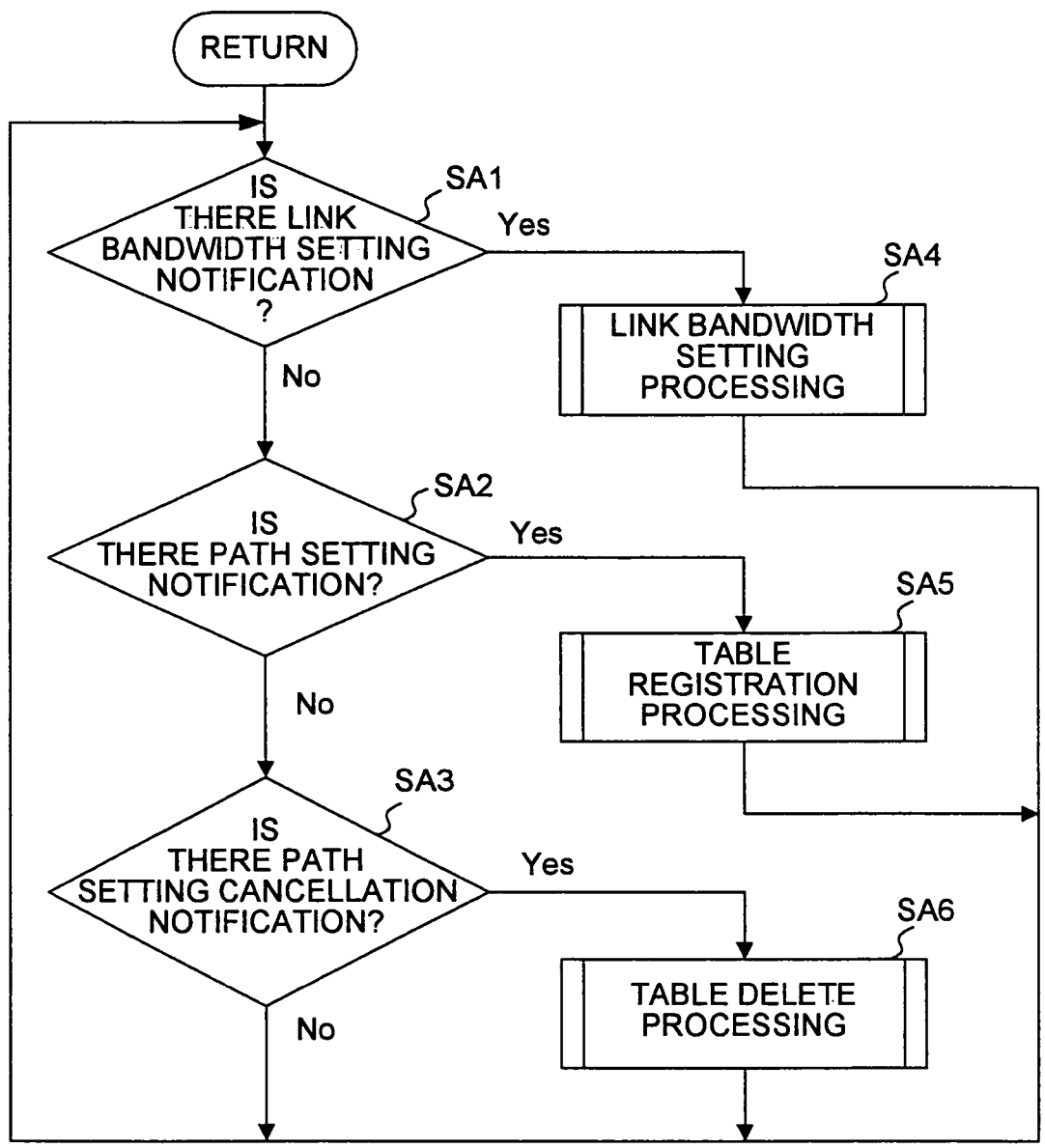
FIG. 9 is a flowchart of the operation of the network layer link apparatus 100 according to the first embodiment and a second embodiment of the present invention.

The operation of the network system according to the first embodiment will be explained next with reference to flowcharts shown in FIG. 9 to FIG. 12 and with reference to FIG. 13 to FIG. 19. FIG. 9 is a flowchart of the operation of the network layer link apparatus 100 (refer to FIG. 1 to FIG. 3) according to the first embodiment.

At step SA1 shown in FIG. 9, the control section 103 (refer to FIG. 3) of the network layer link apparatus 100 determines whether the first NMS 30 issues a link bandwidth setting notification. In this example, the control section 103 sets "No" as a result of the determination made.

When the first NMS 30 sets (or changes) a bandwidth of the link (for example, the link L500) by utilizing the first transmitter $10_1$ and the first transmitter $10_2$ shown in FIG. 1 based on an instruction from the network manager, the first NMS 30 issues a link bandwidth setting notification to the network layer link apparatus 100.

At step SA2 in FIG. 9, the control section 103 determines whether the second NMS 60 issues a path setting notification. In this example, the control section 103 sets "No" as a result of the determination made. When the second NMS 60 sets a path (for example, the path P400) by utilizing the second transmitter $40_1$ and the second transmitter $40_2$ shown in FIG. 1 based on an instruction from the network manager, the second NMS 60 issues a path setting notification to the network layer link apparatus 100.

At step SA3 in FIG. 9, the control section 103 determines whether the second NMS 60 issues a path setting cancellation notification. In this example, the control section 103 sets "No" as a result of the determination made. When the second NMS 60 cancels a path (for example, the path P400) by utilizing the second transmitter $40_1$ and the second transmitter $40_2$ shown in FIG. 1 based on an instruction from the network manager, the second NMS 60 issues a path setting cancellation notification to the network layer link apparatus 100. Thereafter, the control section 103 repeats the processing at step SA1 to step SA3.

Then, in order to set the bandwidth of the link L500, the network manager inputs the link identifier (=500) and the request bandwidth (=500 megabits per second) corresponding to the link L500, to the first NMS 30. The first NMS 30 issues the link bandwidth setting notification to the network layer link apparatus 100.

The control section 103 of the network layer link apparatus 100 sets "Yes" as a result of the determination made at step SA1 in FIG. 9. At this time, the tables $120_1$ to $120_4$ shown in FIG. 3 have the contents as shown in FIG. 13. At step SA4, the control section 103 executes a link bandwidth setting processing.

Figure 10:
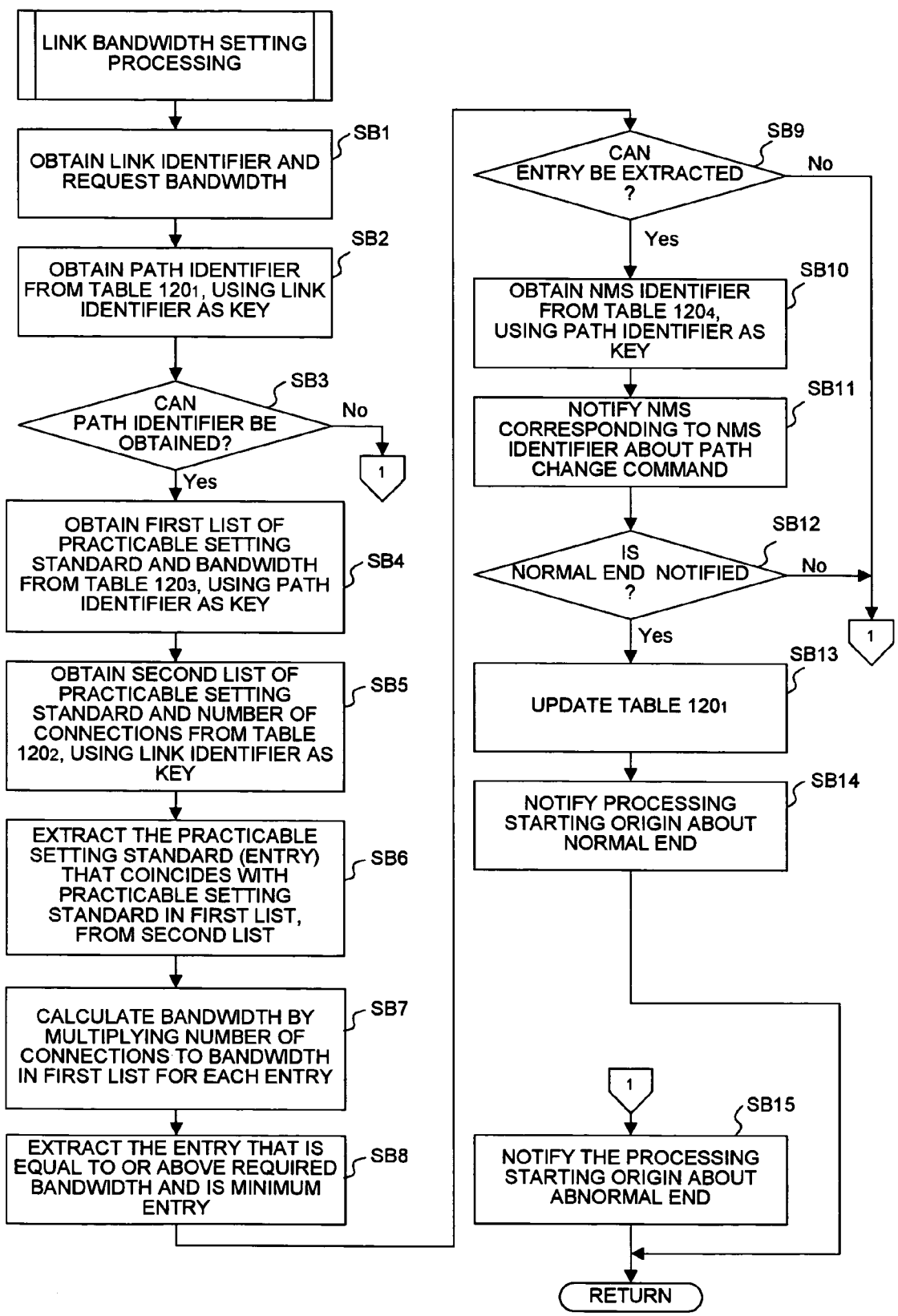
FIG. 10 is a flowchart of a link bandwidth setting processing.

Specifically, at step SB1 shown in FIG. 10, the control section 103 obtains the link identifier (=500) and the request bandwidth (=500 megabits per second) that are input by the network manager, from the first NMS 30.

At step SB2, the control section 103 obtains the path identifier (=400) from the table $120_1$ shown in FIG. 13, using the link identifier (=500) obtained at step SB1 as a key.

At step SB3, the control section 103 determines whether the path identifier can be obtained at step SB2. In this example, the control section 103 sets "Yes" as a result of the determination made. When a result of the determination made at step SB3 is "No", the control section 103 notifies the processing starting origin (the first NMS 30, in this example) about an abnormal end, at step SB15.

At step SB4, the control section 103 obtains the practicable setting standard and the bandwidth as a first list from the table $120_3$ (refer to FIG. 13), using the path identifier (=400) obtained at step SB2 as a key. In this case, the first list consists of (STS-3c, 150 megabits per second) and (STS-24c, 1.24 gigabits per second).

At step SB5, the control section 103 obtains the practicable setting standard and the number of connections as a second list from the table $120_2$, using the link identifier (=500) obtained at step SB1 as a key. In this case, the second list consists of (GbE, 1), (STS-3c, 1), (STS-3c, 4), (STS-3c, 8), and (STS-24c, 1).

At step SB6, the control section 103 extracts an entry (practicable setting standard) that coincides with the practicable setting standard that is present in the first list, from the second list. In other words, the control section 103 extracts the practicable setting standard that is common in the second list and the first list. In the example shown in FIG. 13, the entry that includes (STS-3c) and (STC-24c) is extracted as the practicable setting standard.

At step SB7, the control section 103 multiplies the number of connections to a bandwidth in the first list thereby calculating the bandwidth, for each entry extracted at step SB6. In this example, the bandwidth that can be provided using (STS-3c, 1) is 150 megabits per second, and the bandwidth that can be provided using (STS-3c, 4) is 600 megabits per second. The bandwidth that can be provided using (STS-3c, 8) is 1.20 gigabits per second. The bandwidth that can be provided using (STS-24c, 1) is 1.24 gigabits per second. Calculation results of the bandwidths are listed below.

(STS-3c, 1), 150 megabits per second
(STS-3c, 4), 600 megabits per second
(STS-3c, 8), 1.20 gigabits per second
(STS-24c, 1), 1.24 gigabits per second At step SB8, the control section 103 extracts (STS-3c, 4) and 600 megabits per second as an entry that is equal to or above the required bandwidth (=500 megabits per second) and as a minimum entry, from the above results of the calculation.

At step SB9, the control section 103 determines whether the entry can be extracted at step SB8, and sets "Yes" as a result of the determination made. When a result of the determination made at step SB9 is "No", the control section 103 executes a processing at step SB15.

At step SB10, the control section 103 obtains the NMS identifier (in this example, 10.20.244.3) from the table $120_4$ shown in FIG. 13, using the path identifier (=400) obtained at step SB2 as a key.

At step SB11, the control section 103 notifies the second NMS 60 corresponding to the NMS identifier (=10.20.244.3)

obtained at step SB10 about a path change command (for example, modify (400, STS-3c, 4)).

This path change command (modify (400, STS-3c, 4)) is the instruction to change the setting standard to STS-3c and change the number of connections to 4, for the path P400 that corresponds to the path identifier (=400) obtained at step SB2. The path change command (STS-3c, 4) is the entry that is extracted at step SB8.

When the above path change command is notified, the second NMS 60 makes the second EMS $50_1$, the first EMS $20_1$, and the first EMS $20_2$ change the path. When the path is successfully changed, the second NMS 60 notifies the network layer link apparatus 100 about a normal end (true). On the other hand, when the path change is unsuccessful, the second NMS 60 notifies the network layer link apparatus 100 about an abnormal end (false).

At step SB12, the control section 103 of the network layer link apparatus 100 determines whether the second NMS 60 notifies a normal end of the path change, and in this example, sets "Yes" as a result of the determination made. When a result of the determination made at step SB12 is "No", the control section 103 executes the processing at step SB15.

At step SB13, the control section 103 receives the path change, and updates the entry in the table $120_1$ corresponding to the path identifier (=400). In this example, the number of connections in the entry of the path identifier (=400) in the table $120_1$ shown in FIG. 13 is updated from 1 to 4 (refer to FIG. 14). FIG. 14 illustrates tables that express a state after executing the link bandwidth setting processing.

At step SB14 in FIG. 10, the control section 103 notifies the processing starting origin (the first NMS 30, in this example) about a normal end. The process then returns to the main routine shown in FIG. 9.

Figure 15:
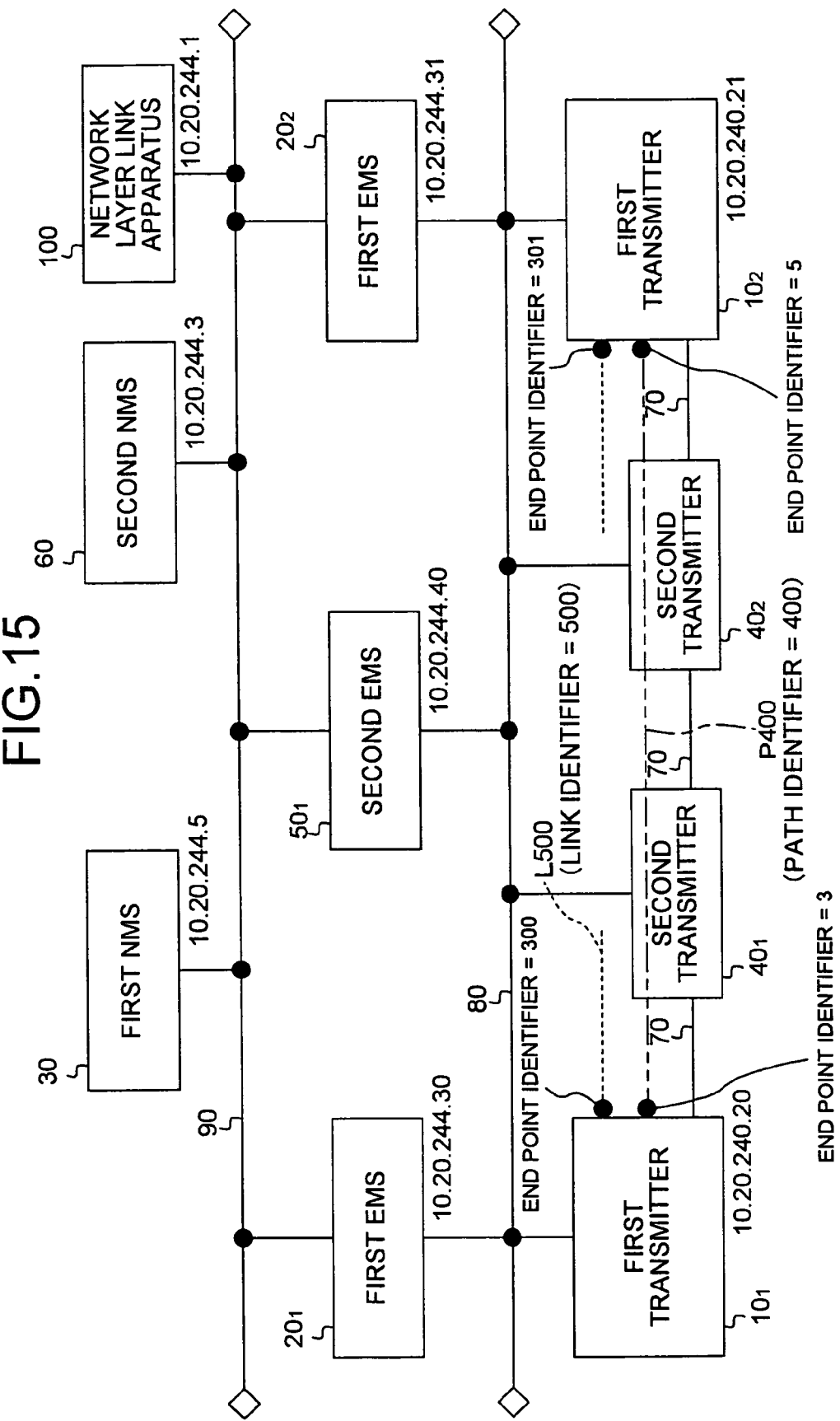
FIG. 15 is a block diagram that explains about the table registration processing according to the first embodiment.

The network manager inputs the practicable setting standard (in this example, STS-3c) and the end point identification information to the second NMS 60 in order to set the path P400 of one STS-3c between the first transmitter $10_1$ and the first transmitter $10_2$ shown in FIG. 15.

In this example, 10.20.244.30-10.20.240.20-3 is input as the end point identification information. In this end point identification information, 10.20.244.30 is the IP address of the first EMS $20_1$. 10.20.240.20 is the IP address of the first transmitter $10_1$. 3 is the end point identifier corresponding to the first transmitter $10_1$.

Further, 10.20.244.31-10.20.240.21-5 is input as the end point identification information. In this end point identification information, 10.20.244.31 is the IP address of the first EMS $20_2$. 10.20.240.21 is the IP address of the first transmitter $10_2$. 5 is the end point identifier corresponding to the first transmitter $10_2$.

The second NMS 60 sets the path P400 (practicable setting standard: STS-3c, path identifier: 400) shown in FIG. 15, based on the information that is input by the network manager, and issues the path setting notification to the network layer link apparatus 100.

The control section 103 of the network layer link apparatus 100 sets "Yes" as a result of the determination made at step SA2 shown in FIG. 9. At step SA5, the control section 103 executes the table registration processing.

Figure 11:
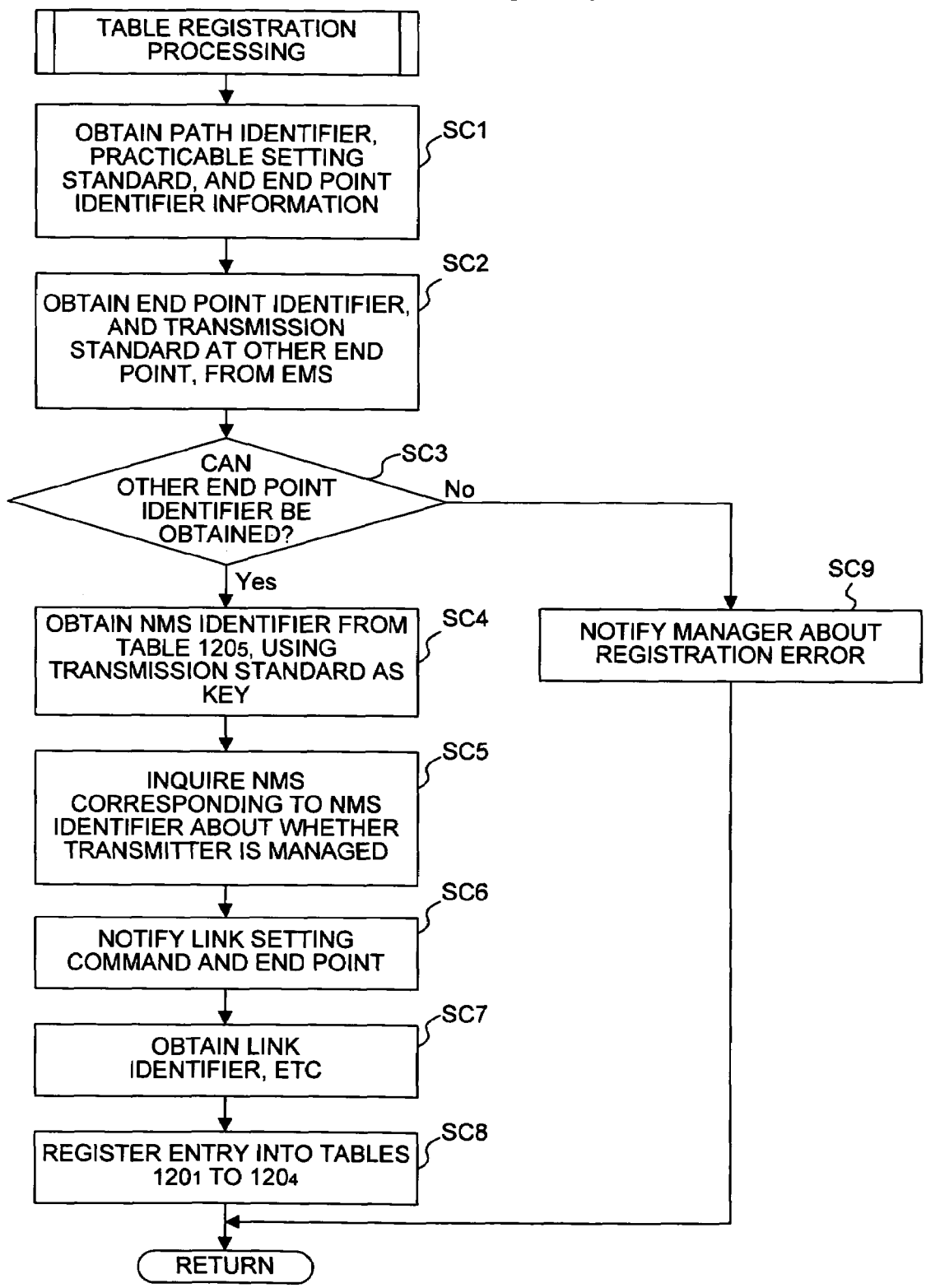
FIG. 11 is a flowchart of a table registration processing.

Specifically, at step SC1 shown in FIG. 11, the control section 103 obtains the path identifier (=400), the practicable setting standard (=STS-3c), and the end point identifier information (10.20.244.30-10.20.240.20-3, 10.20.244.31-10.20.240.21-5), from the second NMS 60.

At step SC2, the control section 103 inquires the first EMS $20_1$ corresponding to 10.20.244.30 obtained at step SC1 about presence or absence of other end point than the end point identifier 3 that is accommodated in the first transmitter $10_1$. When other end point is present, the control section 103 obtains the end point identifier and the transmission standard corresponding to the end point.

Presence or absence of other end point is determined based on presence or absence of a stacked port by referring to a table (ifStackTable (refer to IEEE RFC2233)) that manages a hierarchical state of ports that is stored in the first transmitter $10_1$ (or first transmitter $10_2$), for example.

In this example, it is assumed that other end point is present in the first transmitter $10_1$. The control section 103 obtains an end point identifier (=300) corresponding to the other end point and the first transmission standard as a transmission standard from the first EMS $20_1$.

The control section 103 inquires the first EMS $20_2$ corresponding to 10.20.244.31 obtained at step SC1 about presence or absence of an end point other than the end point identifier 5 that is accommodated in the first transmitter $10_2$.

In this example, it is assumed that other end point is present in the first transmitter $10_2$. The control section 103 obtains an end point identifier (=301) corresponding to the other end point and the first transmission standard as a transmission standard from the first EMS $20_2$.

At step SC3, the control section 103 determines whether the other end point identifier can be obtained at step SC2. In this example, the control section 103 sets "Yes" as a result of the determination made. When a result of the determination at step SC3 is "No", the control section 103 notifies the network manager about a registration error via the display section 101.

At step SC4, the control section 103 obtains the NMS identifier (in this example, 10.20.244.5) from the table $120_5$ shown in FIG. 16, using the transmission standard (in this example, the first transmission standard) obtained at step SC2 as a key. FIG. 16 illustrates tables that express a state before executing the table registration processing.

At step SC5, the control section 103 inquires the first NMS 30 (refer to FIG. 15) corresponding to the above NMS identifier (=10.20.244.5) about whether the first NMS 30 manages the transmitters (in this example, the first transmitter $10_1$ and the first transmitter $10_2$) corresponding to the set of end point identifiers (in this example, the end point identifier=3 and the end point identifier=5) that are obtained at step SC1.

At step SC6, the control section 103 notifies the first NMS 30 about the end point identifiers (in this example, the end point identifiers=300, 301) of the other end points that are obtained at step SC2, and a link setting command to set a link (for example, the link identifier 500) between the other end points.

The first NMS 30 makes the first EMS $20_1$ and the first EMS $20_2$ set the link L500 (link identifier=500) between the end points corresponding to the end point identifiers 300 and 301.

At step SC7, the control section 103 of the network layer link apparatus 100 obtains as update information the link identifier (=500), the path identifier (=400), the practicable setting standard, the number of connections, the bandwidth, the transmission standard, and the NMS identifier that correspond to the set link L500 and the set path P400, from the first NMS 30 and the second NMS 60. At step SC8, the control section 103 registers the new entries into the tables $120_1$ to $120_4$ as shown in FIG. 17 based on the update information. Then, the process returns to the main routine shown in FIG. 9.

The network manager inputs a path setting cancellation command (for example, release (400)) to the second NMS 60 in order to cancel (delete) the setting of the path P400 (path identifier=400).

The second NMS 60 determines whether the setting of the path can be cancelled. For example, when the path is under the test, the setting cannot be canceled. When the setting can be canceled, the second NMS 60 cancels the setting of the path, and issues a path setting cancellation notification to the network layer link apparatus 100.

The control section 10 of the network layer link apparatus 100 sets "Yes" as a result of the determination made at step SA3 shown in FIG. 9. At step SA6, the control section 103 executes the table delete processing.

Figure 12:
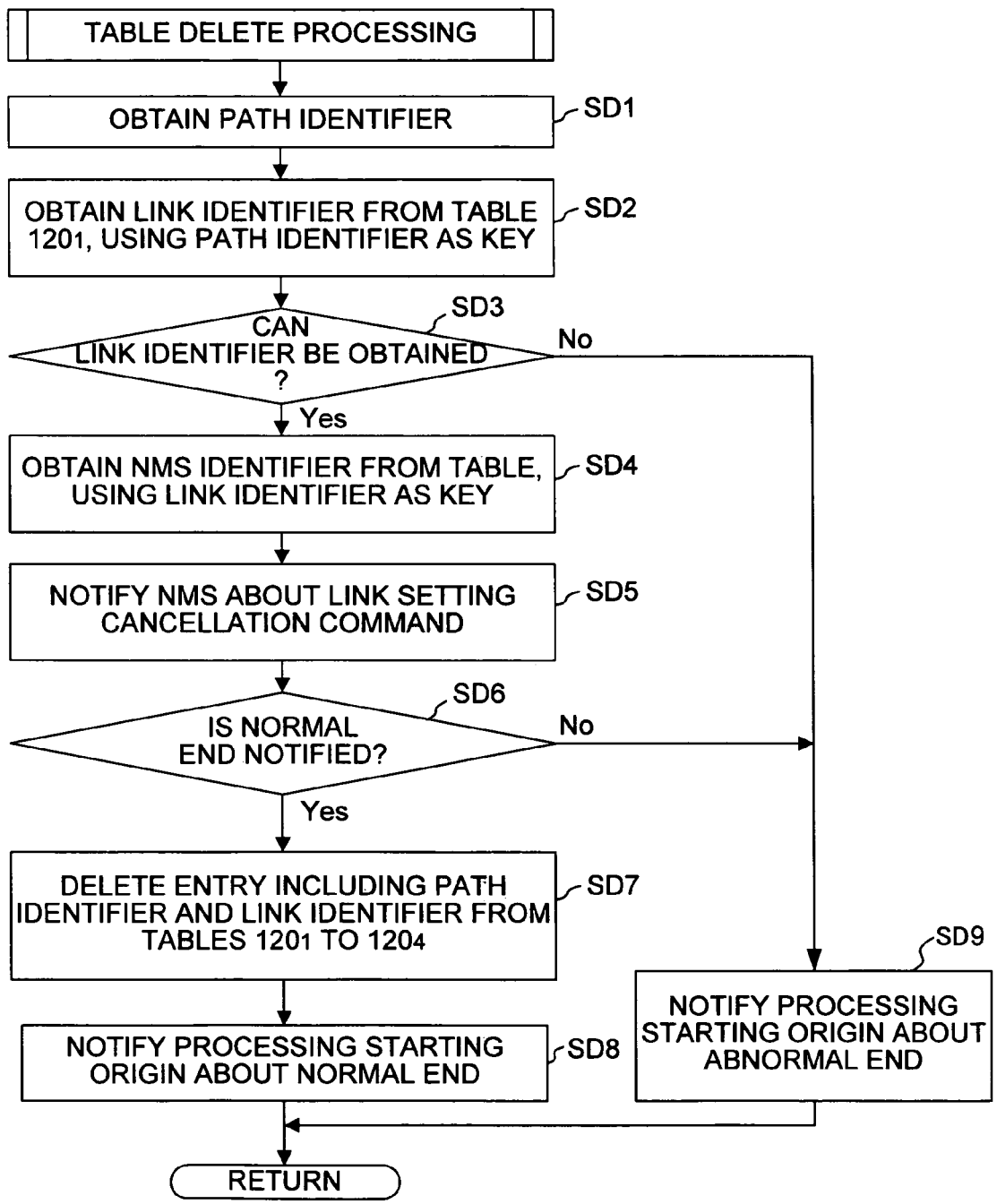
FIG. 12 is a flowchart of a table delete processing.

Specifically, at step SD1 shown in FIG. 12, the control section 103 obtains from the second NMS 60 the path identifier (in this example, the path identifier=400) corresponding to the path of which setting is canceled. At step SD2, the control section 103 obtains the link identifier (in this example, 500) from the table $120_1$ shown in FIG. 18, using the path identifier (=400) as a key. FIG. 18 illustrates tables that express a state before executing the table delete processing.

At step SD3, the control section 103 determines whether the link identifier can be obtained at step SD2, and, in this example, sets "Yes" as a result of the determination made. When a result of the determination made at step SD3 is "No", the control section 103 notifies the processing starting origin (in this example the second NMS 60) about an abnormal end.

At step SD4, the control section 103 obtains the NMS identifier (in this example, 10.20.244.5) from the table $120_4$ shown in FIG. 18, using the link identifier (=500) obtained at step SD2 as a key.

At step SD5, the control section 103 notifies the first NMS 30 corresponding to the above NMS identifier (=10.20.244.5) about the link setting cancellation command (for example, release (500)), in order to cancel (delete) the setting of the link L500 corresponding to the link identifier (=500).

The first NMS 30 determines whether the setting of the link can be canceled. In this example, when the setting can be canceled, the first NMS 30 cancels the setting of the link, and responds to the network layer link apparatus 100 about a normal end (true). When the setting cannot be canceled, the first NMS 30 responds an abnormal end (false).

At step SD6, the control section 103 determines whether the first NMS 30 notifies about the normal end, and, in this example, sets "Yes" as a result of the determination made. When a result of the determination made at step SD6 is "No", the control section 103 executes the processing at step SD9. At step SD7, the control section 103 deletes the entry including the path identifier (=400) and the link identifier (=500) corresponding to the path P400 and the link L500 of which settings are canceled, from the tables $120_1$ to $120_4$ as shown in FIG. 19.

At step SD8, the control section 103 notifies the processing starting origin (in this example, the second NMS 60) about a normal end. Then, the process returns to the main routine shown in FIG. 9.

As explained above, according to the first embodiment, the relationship between the link or the like (first configuration information) concerning the first layer (first network layer) at the first NMS 30 side and the path or the like (second configuration information) concerning the configuration of the second layer (second network layer) at the second NMS 60 side is managed in each table. The first configuration information and the second configuration information are automatically updated following a change in the configuration (e.g., link setting, path setting, and bandwidth setting). When the configuration in any one of the first layer and the second layer is changed, a change of the configuration is instructed to the other layer that requires the change. Therefore, the load of the network manager can be reduced.

Moreover, when the bandwidth is changed in the first layer at the first NMS 30 side, a change instruction concerning the change of the bandwidth is issued to the second layer at the second NMS 60 side. Therefore, the load of the network manager following the change of the bandwidth can be reduced.

While one path P400 shown in FIG. 1 is explained in the first embodiment, the network layer link apparatus 100 can also execute a link when one path consists of a plurality of sub paths. An example of this configuration will be explained below as the second embodiment.

Figure 20:
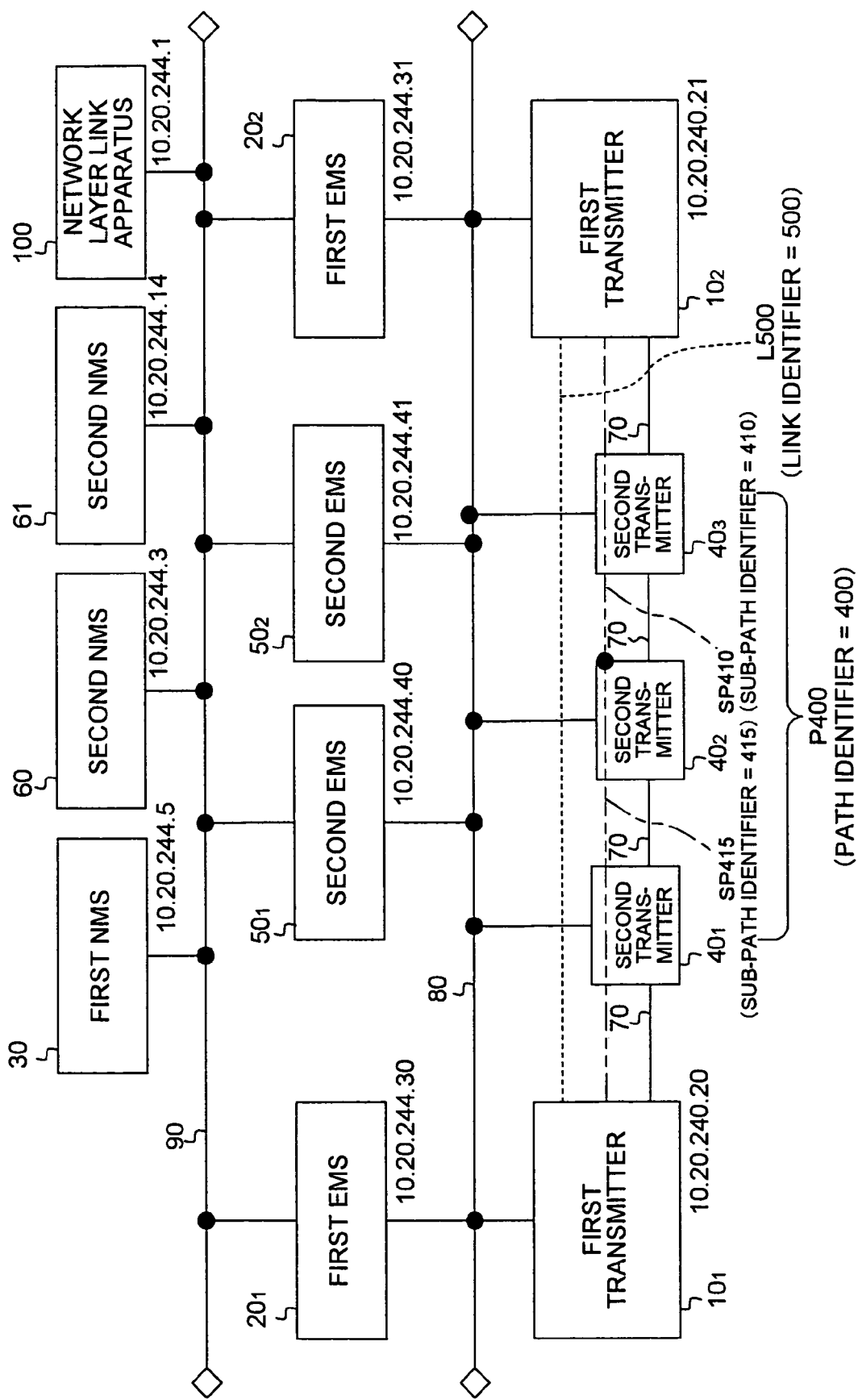
FIG. 20 is a block diagram of a configuration of a network system according to the second embodiment.

FIG. 20 is a block diagram of a configuration of a network system according to a second embodiment of the present invention. In FIG. 20, parts corresponding to those in FIG. 1 are designated with like reference numerals. In FIG. 20, a second transmitter $40_3$, a second EMS $50_2$, and a second NMS 61 are additionally provided.

The second transmitter $40_3$ has functions similar to those of the second transmitter $40_1$, a second EMS $40_2$. However, in the example shown in FIG. 20, the one path P400 consisting of two sub paths SP 410 and SP 415 is provided. The second EMS $50_2$ directly manages restarting, path setting, and cancellation of the second transmitter $40_3$.

The second NMS 61 is a host system of the second EMS $50_2$, and is operated by the network manager. The second NMS 61 makes the second EMS $50_2$ execute the management of the second transmitter $40_3$ based on a command from the network manager.

Figure 21:
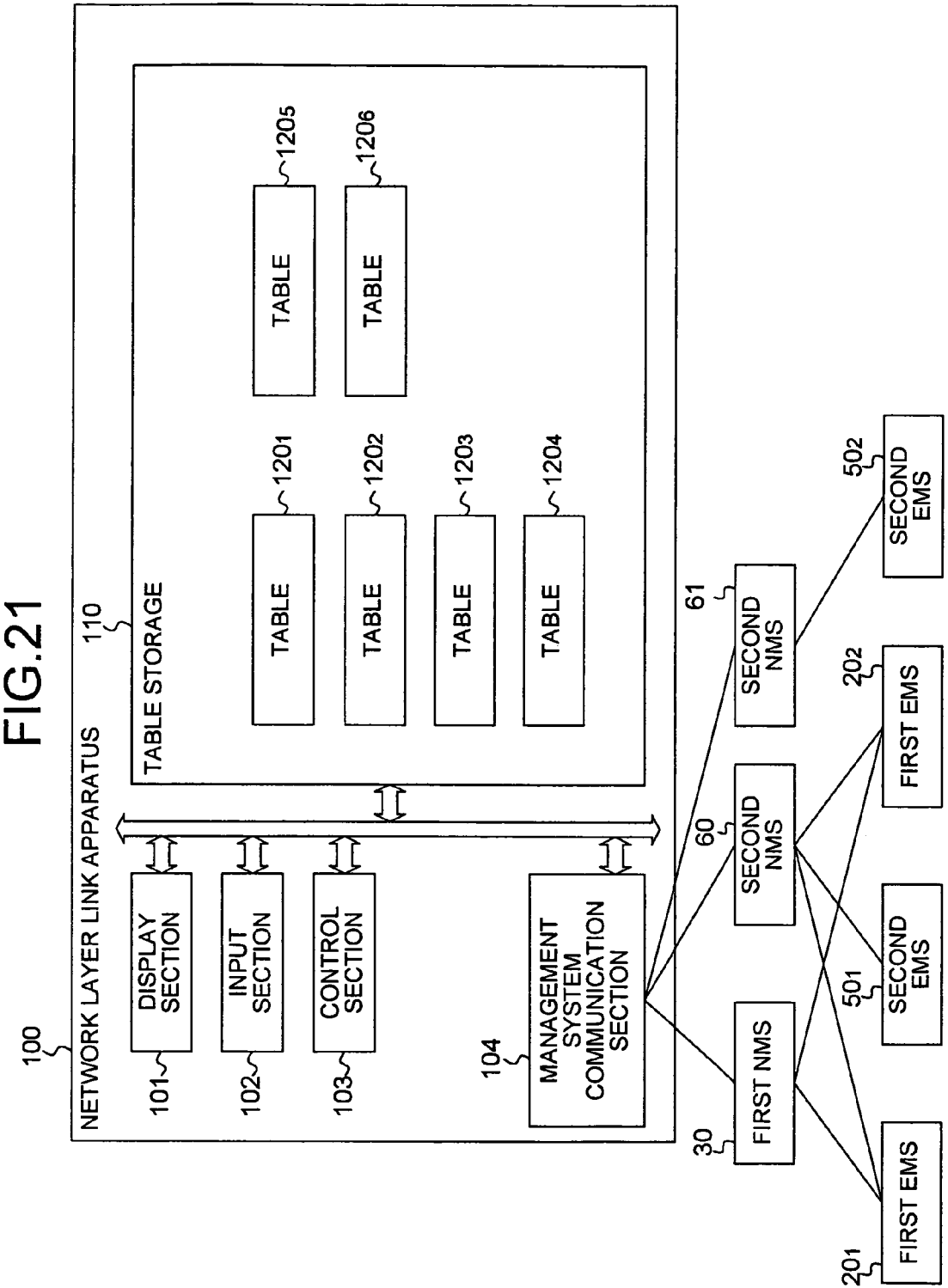
FIG. 21 is a block diagram of a configuration of the network layer link apparatus according to the second embodiment.

FIG. 21 is a block diagram of a configuration of the network layer link apparatus 100 shown in FIG. 20. In the second embodiment, the table storage 110 additionally stores a table $120_6$.

The table $120_6$ has fields called "path identifier", "sub-path identifier", "setting standard", and "number of connections". The "link identifier" identifies links that are set by the first transmitter $10_1$ and the first transmitter $10_2$. The "path identifier" identifies paths that are set by the second EMS $50_1$ and the second EMS $50_2$ (refer to FIG. 20).

The "sub-path identifier" identifies a sub path that constitutes the above path. The "setting standard" is used to execute the above setting. The "number of connections" expresses a number of transmission lines having a predetermined bandwidth at the time of constructing the above path.

The operation of the network system according to the second embodiment will be explained next with reference to flowcharts shown in FIG. 9 to FIG. 23.

In order to set the bandwidth of the link L500, the network manager inputs the link identifier (=500) and the request bandwidth (=500 megabits per second) corresponding to the link L500, to the first NMS 30. The first NMS 30 issues the link bandwidth setting notification to the network layer link apparatus 100.

The control section 103 of the network layer link apparatus 100 sets "Yes" as a result of the determination made at step SA1 in FIG. 9. At this time, the tables $120_1$ to $120_4$ shown in FIG. 21 have the contents as shown in FIG. 24.

In the second embodiment, the path identifier of table $120_3$ and the link/path identifier of the table $120_4$ shown in FIG. 24 also include sub-path identifiers. At step SA4, the control section 103 executes a link bandwidth setting processing.

Figure 23:
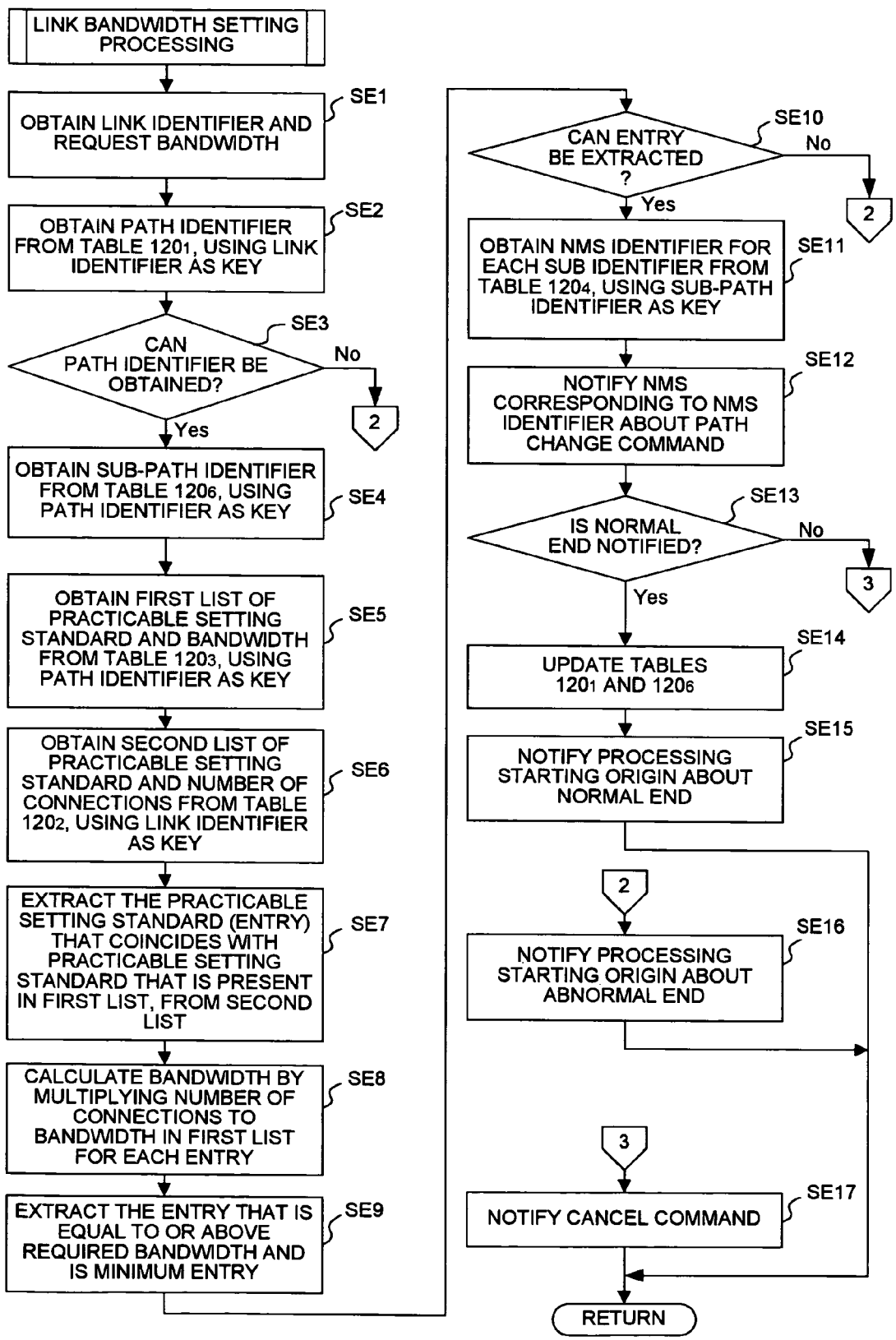
FIG. 23 is a flowchart of a link bandwidth setting processing according to the second embodiment.

Specifically, at step SE1 shown in FIG. 23, the control section 103 obtains the link identifier (=500) and the request bandwidth (=500 megabits per second) that are input by the network manager, from the first NMS 30.

At step SE2, the control section 103 obtains the path identifier (=400) from the table $120_1$ shown in FIG. 24, using the link identifier (=500) obtained at step SE1 as a key.

At step SE3, the control section 103 determines whether the path identifier can be obtained at step SE2. In this example, the control section 103 sets "Yes" as a result of the determination made. When a result of the determination made at step SE3 is "No", the control section 103 notifies the processing starting origin (the first NMS 30, in this example) about an abnormal end, at step SE16.

At step SE4, the control section 103 obtains the sub-path identifiers (in this example, 410 and 415) from the table $120_6$ (refer to FIG. 24), using the path identifier (=400) obtained at step SE2 as a key.

At step SE5, the control section 103 obtains the practicable setting standard and the bandwidth as a first list from the table $120_3$ (refer to FIG. 24), using the path identifier (=400) obtained at step SE2 as a key. In this case, the first list consists of (STS-3c, 150 megabits per second) and (STS-24c, 1.24 gigabits per second) concerning the sub-path identifier (=410), and (STS-3c, 150 megabits per second) and (STS-12c, 6.22 megabits per second) concerning the sub-path identifier (=415).

At step SE6, the control section 103 obtains the practicable setting standard and the bandwidth as a first list from the table $120_2$ (refer to FIG. 24), using the link identifier (=500) obtained at step SE1 as a key. In this case, the second list consists of (GbE, 1), (STS-3c, 1), (STS-3c, 4), (STS-3c, 8), and (STS-24c, 1).

At step SE7, the control section 103 extracts an entry (practicable setting standard) that coincides with the practicable setting standard that is present in the first list, from the second list. In the example, the entry that includes (STS-3c) is extracted as the practicable setting standard.

At step SE8, the control section 103 multiplies the number of connections to a bandwidth in the first list thereby calculating the bandwidth, for each entry extracted at step SE7. In this example, the bandwidth that can be provided using (STS-3c, 1) is 150 megabits per second, and the bandwidth that can be provided using (STS-3c, 4) is 600 megabits per second. The bandwidth that can be provided using (STS-3c, 8) is 1.20 gigabits per second. Calculation results of the bandwidths are listed below.

(STS-3c, 1), 150 megabits per second
(STS-3c, 4), 600 megabits per second
(STS-3c, 8), 1.20 gigabits per second
(STS-3c, 4), 600 megabits per second At step SE9, the control section 103 extracts (STS-3c, 4) and 600 megabits per second as an entry that is equal to or above the required bandwidth (=500 megabits per second) and as a minimum entry, from the above results of the calculation.

At step SE10, the control section 103 determines whether the entry can be extracted at step SE9, and sets "Yes" as a result of the determination made. When a result of the determination made at step SE10 is "No", the control section 103 executes a processing at step SE16.

At step SE11, the control section 103 obtains the NMS identifiers (in this example, 10.20.244.3 and 10.20.244.14) from the table $120_4$ shown in FIG. 24, using the sub-path identifiers (=410 and 415) obtained at step SE4 as keys.

At step SE12, the control section 103 notifies the second NMS 60 and the second NMS 61 corresponding to the NMS identifiers (10.20.244.3 and 10.20.244.14) obtained at step SE11 about a path change command (for example, modify (410, STS-3c, 4) and modify (415, STS-3c, 4)).

This path change command (modify (410, STS-3c, 4)) is the instruction to change the setting standard to STS-3c and change the number of connections to 4, for the path P410 that corresponds to the sub-path identifier (=410) obtained at step SE4.

Similarly, the path change command (modify (415, STS-3c, 4)) is the instruction to change the setting standard to STS-3c and change the number of connections to 4, for the path P415 that corresponds to the sub-path identifier (=415) obtained at step SE4.

When the above path change command is notified, the second NMS 60 and the second NMS 61 make the second EMS $50_1$, the second EMS $50_2$, the first EMS $20_1$, and the first EMS $20_2$ change the path. When the path is successfully changed, the second NMS 60 and the second NSM 61 notify the network layer link apparatus 100 about a normal end (true). On the other hand, when the path change is unsuccessful, the second NMS 60 and the second NSM 61 notify the network layer link apparatus 100 about an abnormal end (false).

At step SE13, the control section 103 of the network layer link apparatus 100 determines whether the second NMS 60 notifies a normal end of the path change, and in this example, sets "Yes" as a result of the determination made. When a result of the determination made at step SE13 is "No", the control section 103 notifies the NMSs (i.e., the second NMS 60, and second NMS 61) that receive the notification of the abnormal end, about a cancel command (for, example, cancel_modify (410)), at step SE17.

At step SE14, the control section 103 receives the path change, and updates the entry in the table $120_1$ corresponding to the path identifier (=400), and the entry in the table $120_6$ corresponding to the sub-path identifiers (=410 and 415).

In this example, the number of connections in each entry of the path identifier (=400) in the table $120_1$ shown in FIG. 24 is updated from 1 to 4 (refer to FIG. 25). FIG. 25 illustrates tables that express a state after executing the link bandwidth setting processing. Similarly, the number of connections in each entry of the sub-path identifiers (=410 and 415) in the table $120_6$ shown in FIG. 24 is updated from 1 to 4 (refer to FIG. 25).

At step SE15, the control section 103 notifies the processing starting origin (the first NMS 30, in this example) about a normal end. The process then returns to the main routine shown in FIG. 9.

In the second embodiment, the table registration processing (refer to FIG. 11) and the table delete processing (refer to FIG. 12) are executed, and the entries in the tables $120_1$ to $120_6$ are registered and deleted, in a similar manner to that in the first embodiment.

As explained above, according to the second embodiment, the second layer side consists of a plurality of sub paths (layer elements). The information about the link, the path, and the sub path is managed in the tables $120_1$ to $120_6$. Therefore, the load of the network manager can be reduced regardless of a complex configuration.

In the first and the second embodiments, communication service (hereinafter, "service") can also be managed in addition to the link and the path. An example of this configuration will be explained below as the third embodiment.

Figure 26:
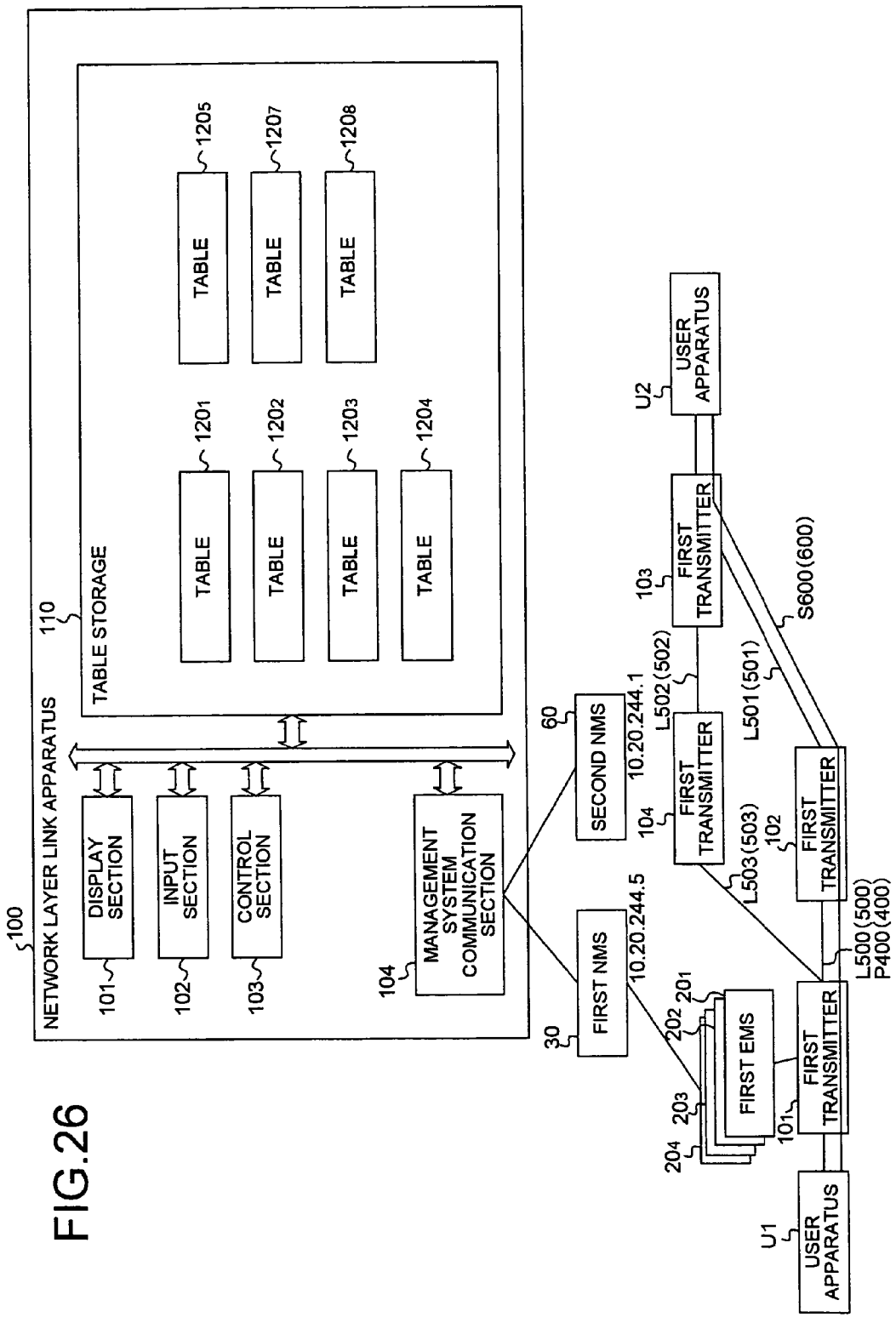
Figure 27:
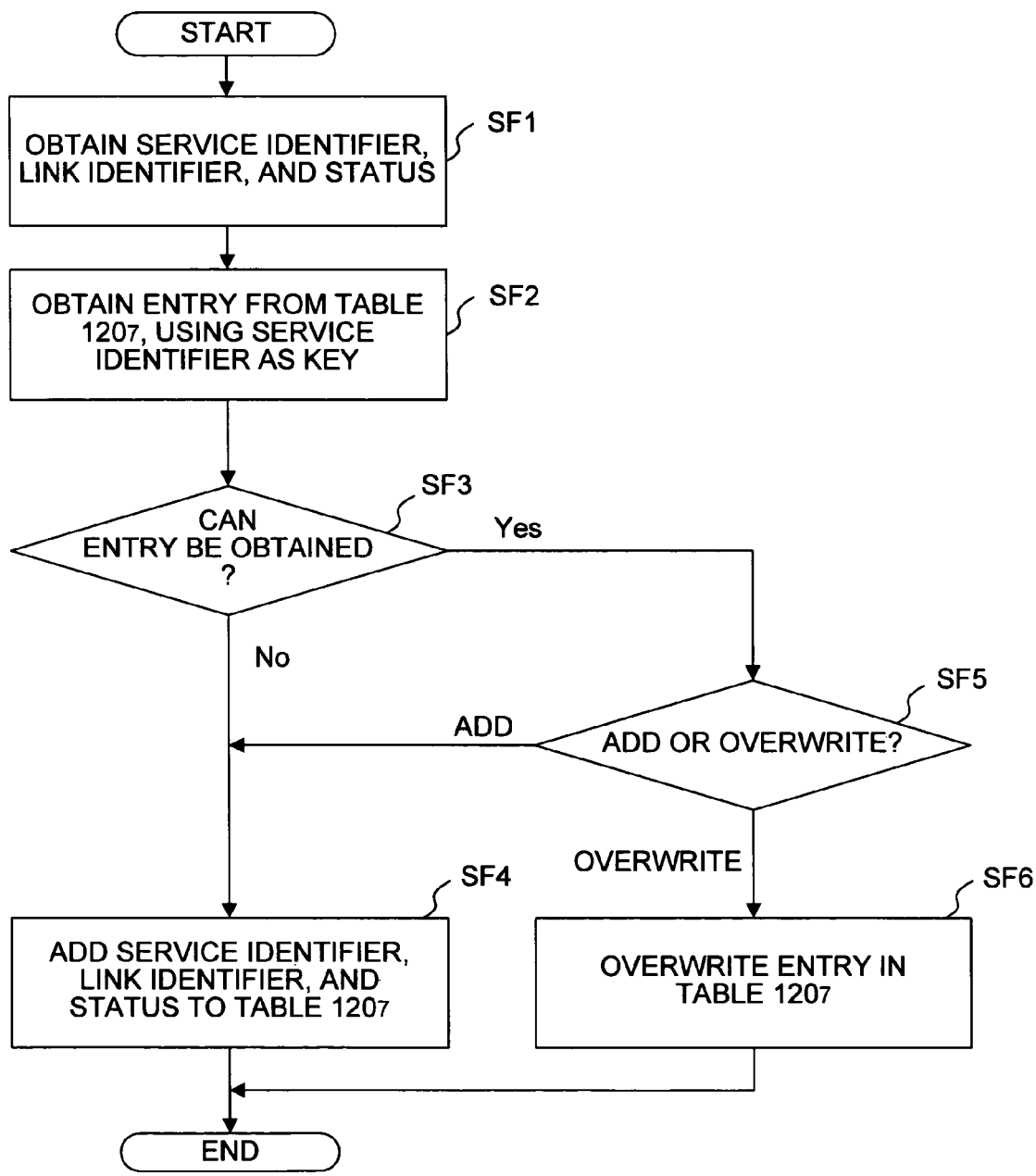
FIG. 27 is a flowchart of a first registration processing according to the third embodiment.
Figure 28:
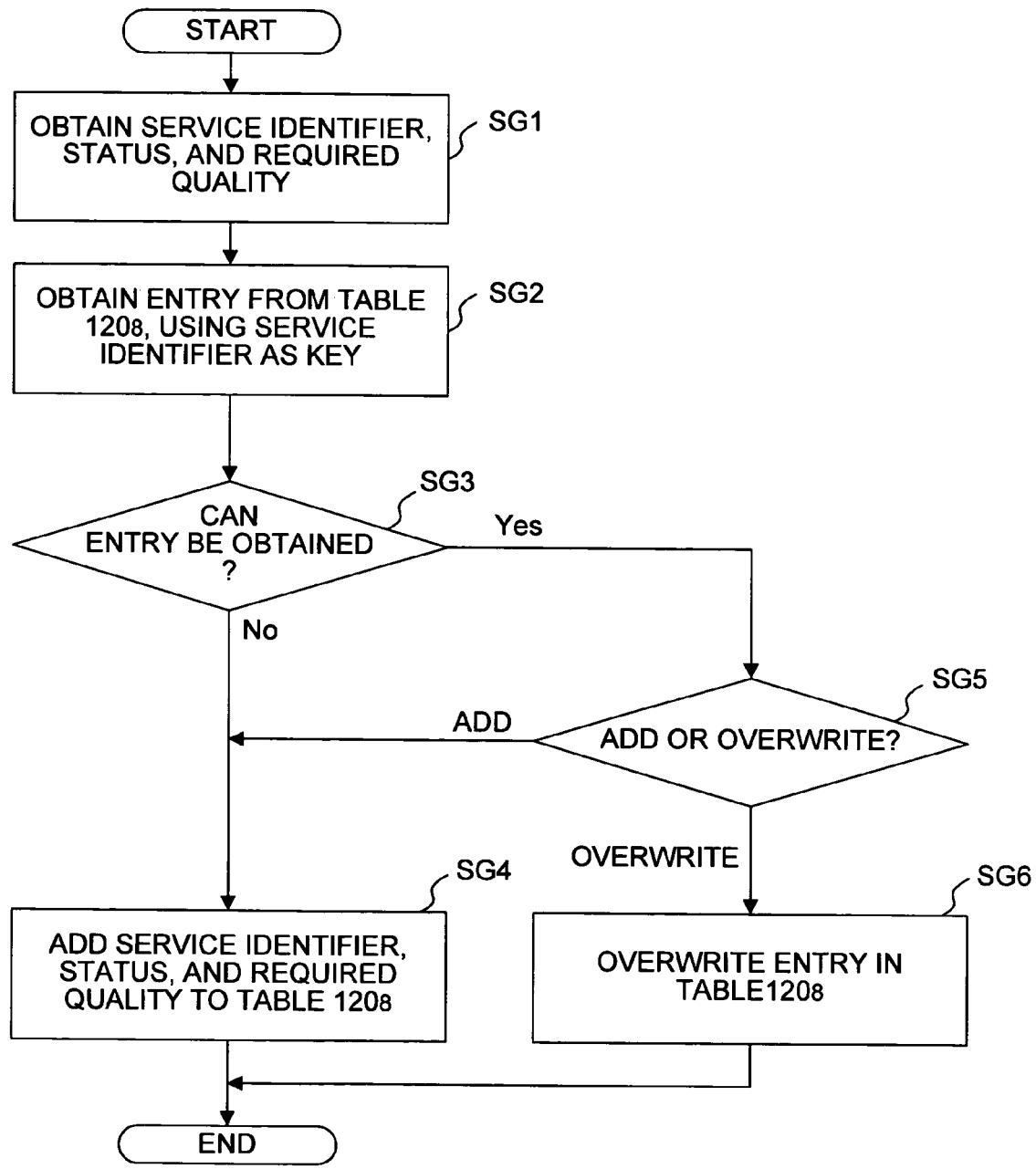
FIG. 28 is a flowchart of a link bandwidth setting processing according to a third embodiment.

FIG. 26 is a block diagram of a configuration of a network system according to a third embodiment of the present invention. In FIG. 26, parts corresponding to those in FIG. 3 are designated with like reference numerals. In FIG. 26, the first EMSs $20_1$ to $20_4$ are provided in place of the first EMS $20_1$ and $20_2$ shown in FIG. 3, and the first transmitters $10_1$ to $10_4$, a user apparatus $U_1$, and a user apparatus $U_2$ are additionally provided.

The first transmitters $10_1$ to $10_4$ transmit packets at the links L500 to L503 based on the first transmission standard (Ethernet (R)). Specifically, the link L500 is provided between the first transmitter $10_1$ and the first transmitter $10_2$. This link L500 is provided with 500 as a link identifier.

The link L501 is provided between the first transmitter $10_2$ and the first transmitter $10_3$. This link L501 is provided with 501 as a link identifier. The link L502 is provided between the first transmitter $10_3$ and the first transmitter $10_4$. This link L502 is provided with 502 as a link identifier.

Similarly, the link L503 is provided between the first transmitter $10_1$ and the first transmitter $10_4$. This link L503 is provided with 503 as a link identifier.

The first EMS $20_1$ directly manages the first transmitter $10_1$ concerning a restart, and a setting and a cancellation of a link. The first EMSs $20_2$ to $20_4$, of which connection line is omitted, also directly manages the first transmitters $10_2$ to $10_4$ concerning a restart, and a setting and a cancellation of a link, like the first EMS $20_1$.

The user apparatus $U_1$ and the user apparatus $U_2$ are provided at the side of users who utilize service S600, and are connected to the first transmitter $10_1$ and the first transmitter $10_3$.

The service S600 is service (refer to IEEE 802.3) of a virtual local area network (VLAN) that consists of the link L500 and the link L501, and provides the users with a function of the VLAN. The service S600 is assigned with 600 as a service identifier.

In FIG. 26, a plurality of second transmitters (for example, the second transmitters $40_1$, $40_2$, ... (refer to FIG. 1)) that are managed by the second NMS 60 are not shown. These second transmitters set paths (not shown) corresponding to the links L500 to L503.

In the third embodiment, the table storage 110 of the network layer link apparatus 100 additionally stores a table $120_7$ and a table $120_8$.

As shown in FIG. 32A, the table $120_7$ has fields called "service identifier", "link identifier", and "status". The "service identifier" identifies the service (the service S600 (VLAN service) in the example shown in FIG. 26) corresponding to the link. The "link identifier" identifies the link corresponding to the "service". The "status" expresses a status of service (in-service, or out-of-service (stop), etc.)).

As shown in FIG. 33A, the table $120_8$ has fields called "service identifier", "status", and "required quality (communication waiting time)". The "service identifier" and "status" correspond to the "service identifier" and "status" in the table $120_7$ (refer to FIG. 32A). The "required quality (communication waiting time)" expresses a waiting time from when a trouble such as a service stop occurs until when the trouble is notified to the network manager.

The operation of the system according to the third embodiment will be explained with reference to flowcharts shown in FIG. 27 to FIG. 31, and with reference to FIGS. 32A and 32B to FIG. 38.

First, a first registration processing to register an entry into the table $120_7$ shown in FIG. 32A will be explained. In FIG. 26, the network manager sets 600 as the service identifier of the service S600, 500 and 501 as the link identifiers of the links L500 and L501 corresponding to the service S600, and in-service as the status of the service, into the first NMS 30.

The first NMS 30 notifies the network layer link apparatus 100 about the service identifier, the link identifiers, and the status. At step SF1 shown in FIG. 27, the control section 103 obtains the service identifier (=600), the link identifiers (=500, and 501), and the status (=in-service), from the first NMS 30.

At step SF2, the control section 103 extracts the entry from the table $120_7$ shown in FIG. 32A, using the service identifier obtained at step SF1 as a key. FIG. 32A illustrates the table $120_7$ before executing the first registration processing. No entry is registered in the table $120_7$ shown in FIG. 32A.

At step SF3, the control section 103 determines whether the entry can be extracted, and sets "No" as a result of the determination made, in this example. At step SF4, the control section 103 adds the entry (the service identifier (=600), the link identifiers (=500, and 501), and the status (=in-service)) to the table $120_7$, as shown in FIG. 32B.

On the other hand, when a result of the determination made at step SF3 is "Yes", the control section 103 inquires the network manager about whether the entry is to be added or overwritten, at step SF5.

When the network manager instructs the addition, the control section 103 adds the entry to the table $120_7$, at step SF4. On the other hand, when the network manager instructs the overwriting, the control section 103 overwrites the entry already registered in the table $120_7$, at step SF6.

The second registration processing to register the entry into the table $120_8$ shown in FIG. 33A will be explained next. In FIG. 26, the network manager sets 600 as the service identifier of the service S600, in-service as the status of the service, and 15 minutes as the required quality (communication waiting time), into the first NMS 30.

The first NMS 30 notifies the network layer link apparatus 100 about the service identifier, the status, and the required quality (communication waiting time). At step SG1 shown in FIG. 28, the control section 103 obtains the service identifier (=600), the status (=in-service), and the required quality (=15 minutes), from the first NMS 30.

At step SG2, the control section 103 extracts the entry from the table $120_8$ shown in FIG. 33A, using the service identifier obtained at step SG1 as a key. FIG. 33A illustrates the table $120_8$ before executing the second registration processing. No entry is registered in the table $120_8$ shown in FIG. 33A.

At step SG3, the control section 103 determines whether the entry can be extracted, and sets "No" as a result of the determination made, in this example. At step SG4, the control section 103 adds the entry (the service identifier (=600), the status (=in-service), and the required quality (=15 minutes), as shown in FIG. 33B.

On the other hand, when a result of the determination made at step SG3 is "Yes", the control section 103 inquires the network manager about whether the entry is to be added or overwritten, at step SG5.

When the network manager instructs the addition, the control section 103 adds the entry to the table $120_8$, at step SG4. On the other hand, when the network manager instructs the overwriting, the control section 103 overwrites the entry already registered in the table $120_8$, at step SG6.

The delete processing to delete the entry from the tables $120_1$ to $120_4$ and the table $120_7$ shown in FIG. 34 will be explained next.

In FIG. 26, the network manager inputs a path setting cancellation command (for example, release (400)) to the second NMS 60 in order to cancel (delete) the setting of the path P400 (path identifier=400).

The second NMS 60 determines whether the setting of the path can be cancelled. For example, when the path is under the test, the setting cannot be canceled. When the setting can be canceled, the second NMS 60 cancels the setting of the path, and issues a path setting cancellation notification to the network layer link apparatus 100.

Figure 29:
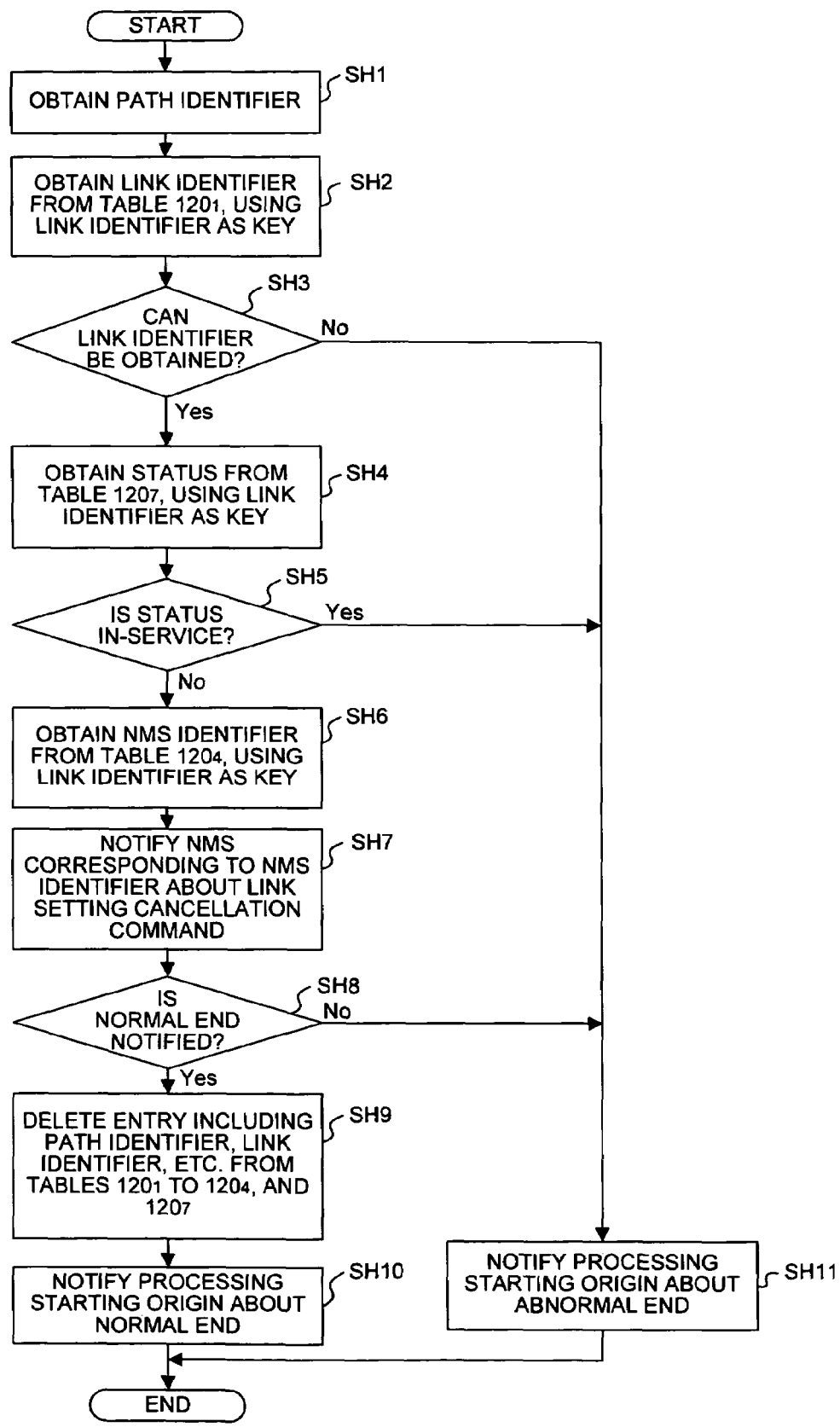
FIG. 29 is a flowchart of a delete processing according to the third embodiment.

At step SH1 shown in FIG. 29, the control section 103 of the network layer link apparatus 100 obtains from the second NMS 60 the path identifier (in this example, the path identifier=400) corresponding to the path of which setting is canceled.

At step SH2, the control section 103 obtains the link identifier (in this example, 500) from the table 120$_1$ shown in FIG. 34, using the path identifier (=400) as a key. FIG. 34 illustrates tables that express a state before executing the table delete processing.

At step SH3, the control section 103 determines whether the link identifier can be obtained at step SH2, and, in this example, sets "Yes" as a result of the determination made. When a result of the determination made at step SH3 is "No", the control section 103 notifies the processing starting origin (in this example the second NMS 60) about an abnormal end.

At step SH4, the control section 103 obtains the status from the table 120$_7$ shown in FIG. 34, using the link identifier (=500) obtained at step SH2 as a key. At step SH5, the control section 103 determines whether the status is in-service.

When a result of the determination made at step SH5 is "No", the control section 103 obtains at step SH6 the NMS identifier (=10.20.244.5) from the table 120$_4$ shown in FIG. 34, using the link identifier (=500) obtained at step SH2 as a key.

On the other hand, when a result of the determination made at step SH5 is "Yes", that is, when the status is in-service, the control section 103 notifies the processing starting origin (in this example, the second NMS 60) about an abnormal end, and stops the cancellation of the path setting, at step SH11.

At step SH7, the control section 103 notifies the first NMS 30 corresponding to the above NMS identifier (=10.20.244.5) about the link setting cancellation command (for example, release (500)), in order to cancel (delete) the setting of the link L500 corresponding to the link identifier (=500).

The first NMS 30 determines whether the setting of the link can be canceled. In this example, when the setting can be canceled, the first NMS 30 cancels the setting of the link, and responds to the network layer link apparatus 100 about a normal end (true). When the setting cannot be canceled, the first NMS 30 responds an abnormal end (false).

At step SH8, the control section 103 determines whether the first NMS 30 notifies about the normal end, and, in this example, sets "Yes" as a result of the determination made. When a result of the determination made at step SH8 is "No", the control section 103, at step SH11, notifies the processing starting origin (in this example, the second NMS 60) about an abnormal end.

At step SH9, the control section 103 deletes the entry including the path identifier, the link identifier, and the service identifier corresponding to the path, the link, and the service of which setting is canceled, from the tables 120$_1$ to 120$_4$ and the table 120$_7$, as shown in FIG. 35. At step SH10, the control section 103 notifies the processing starting origin (in this case, the second NMS 60) about a normal end.

The trouble notification processing to notify the network manager about the occurrence of a trouble in the path P400 (link L500) shown in FIG. 36 will be explained next.

Figure 36:
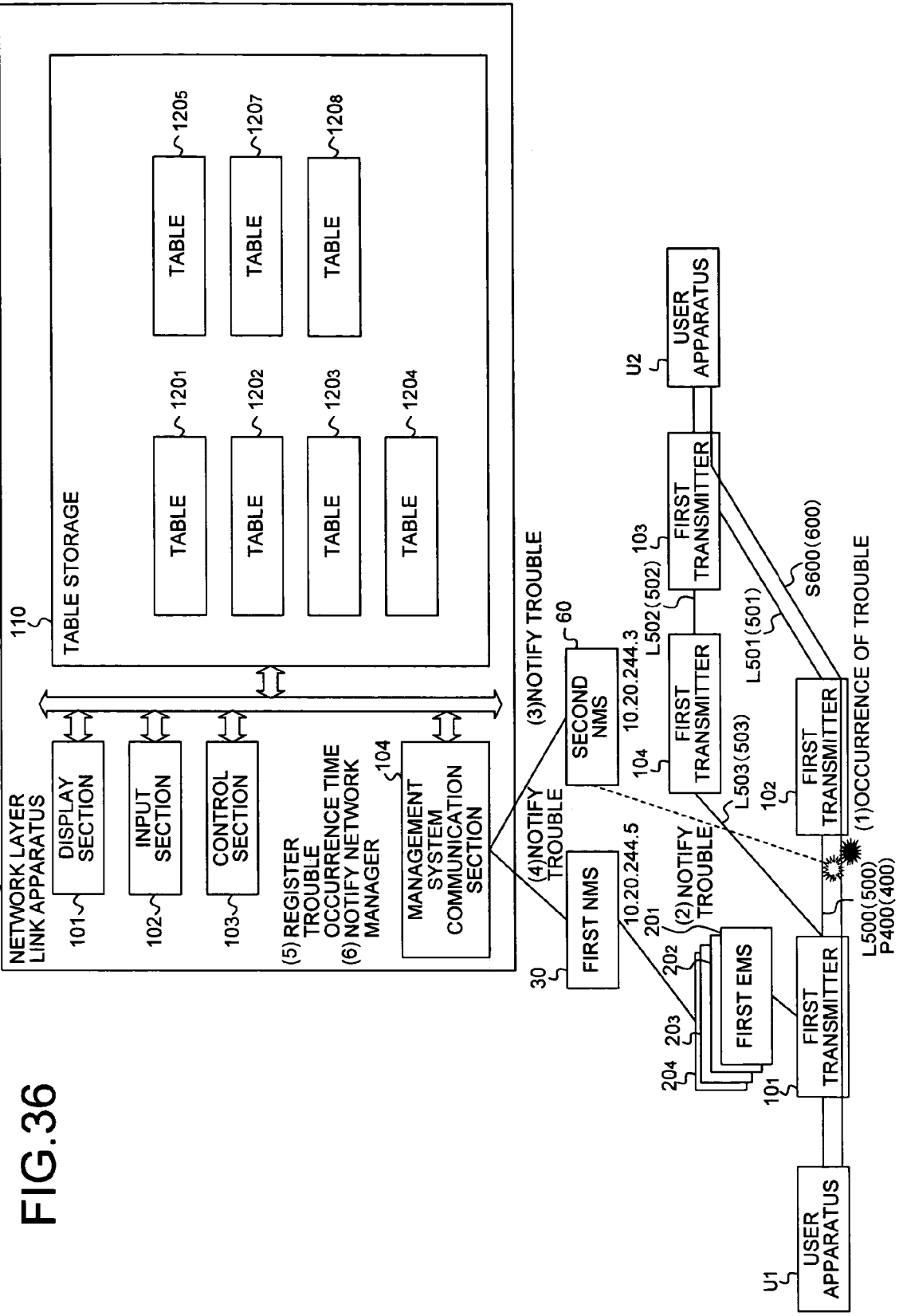
FIG. 36 is a block diagram that explains about a trouble notification processing according to the third embodiment.

In FIG. 36, when a trouble (i.e., service stop) occurs in the path P400 (1), the second NMS 60 detects the trouble (2), and notifies the network layer link apparatus 100 about the occurrence of the trouble (3).

Figure 30:
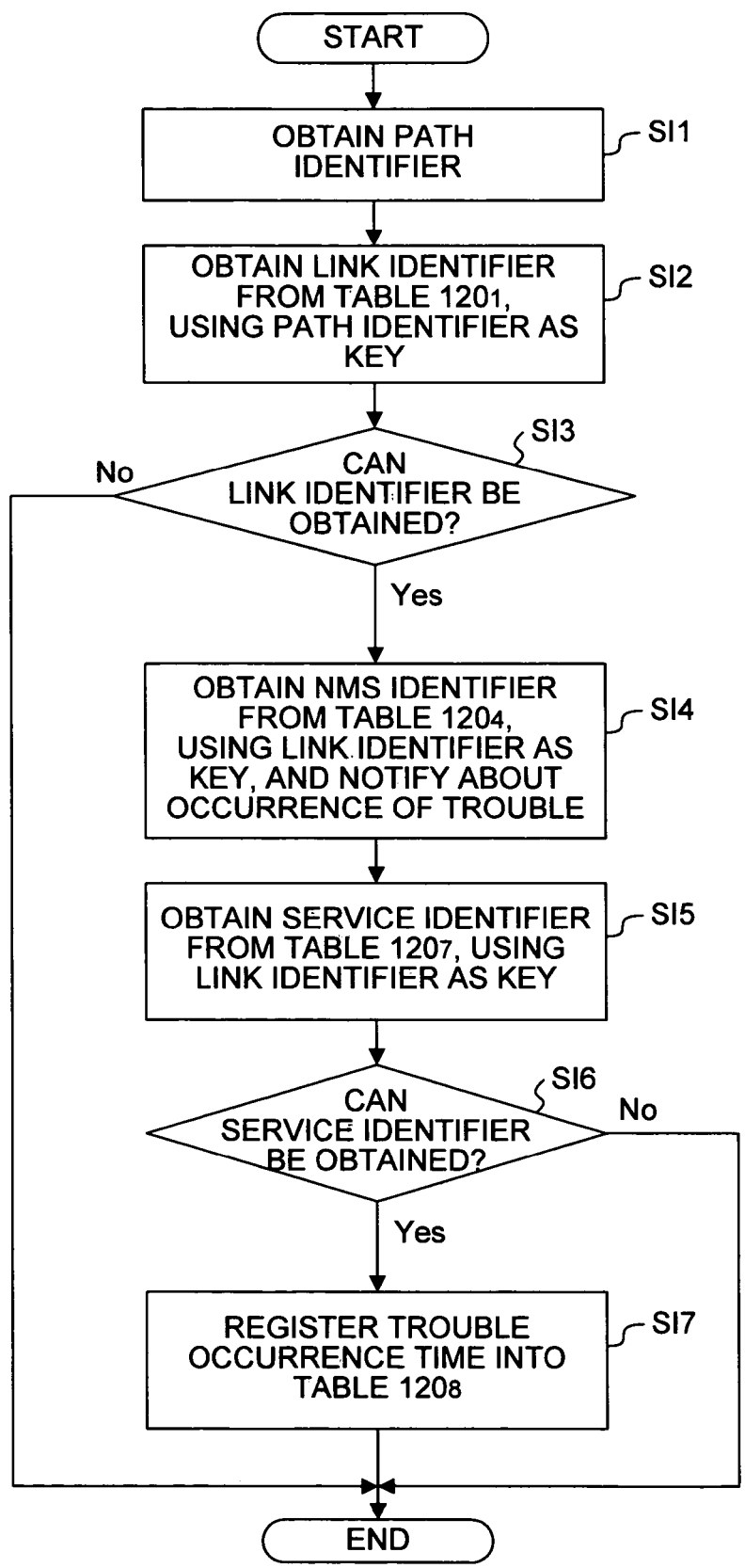
FIG. 30 is a flowchart of a trouble notification processing according to the third embodiment.

At step SI1 shown in FIG. 30, the control section 103 of the network layer link apparatus 100 obtains the path identifier (in this example, 400) corresponding to the trouble occurrence path (in this example, the path P400) from the second NMS 60.

At step SI2, the control section 103 obtains the link identifier (=500) from the table 120$_1$ shown in FIG. 37, using the path identifier (=400) obtained at step SI1. FIG. 37 illustrates tables that express the state before executing the trouble communication processing.

At step SI3, the control section 103 determines whether the link identifier can be obtained at step SI2, and, in this example, sets "Yes" as a result of the determination made. The control section 103 recognizes that there is an influence of the trouble in the link L500 (refer to FIG. 36) corresponding to the link identifier (=500). When a result of the determination made at step SI3 is "No", the trouble notification processing ends.

At step SI4, the control section 103 obtains the NMS identifier (=10.20.244.5) from the table 120$_4$ shown in FIG. 37, using the link identifier (=500) obtained at step SI2 as a key, and notifies the first NMS 60 corresponding to the NMS identifier (=10.20.244.5) about the occurrence of the trouble (refer to FIG. 36: (4)).

At step SI5, the control section 103 obtains the service identifier (=600) from the table 120$_7$ shown in FIG. 37, using the link identifier (=500) as a key. At step SI6, the control section 103 determines whether the service identifier can be obtained, and, in this example, sets "Yes" as a result of the determination made. When a result of the determination made at step SI6 is "No", the trouble notification processing ends.

At step SI7, the control section 103 registers a trouble occurrence time (Fail 10:20) into the status of the entry (the service identifier 600) in the table 120$_8$ as shown in FIG. 38 (refer to FIG. 36 (5)). The trouble occurrence time is the time when the second NMS 60 notifies the trouble.

Figure 31:
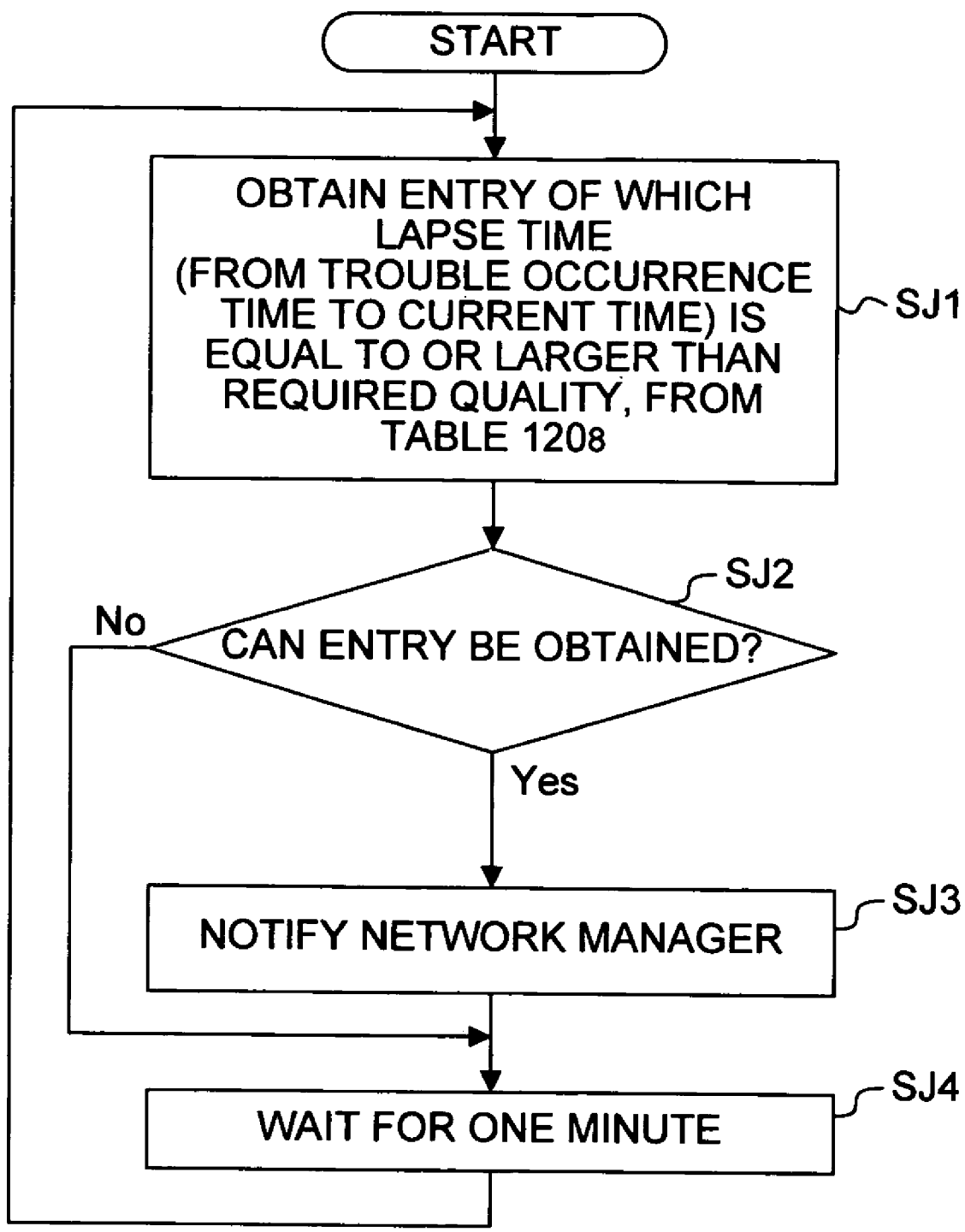
FIG. 31 is a flowchart of a trouble notification processing according to the third embodiment.

At step SJ1 shown in FIG. 31, the control section 103 obtains the entry of which lapse time (from the trouble occurrence time (10:20) to the current time) is equal to or larger than the required quality (i.e., the communication waiting time: 15 minutes), from the table 120$_8$ shown in FIG. 38. At step SJ2, the control section 103 determines whether the entry can be obtained at step SJ1, and in this example, sets "No" as a result of the determination made. A timer (not shown) controls the current time.

At step SJ3, the control section 103 waits for one minute. Thereafter, the lapse time is checked at every one minute until when a result of the determination made at step SJ2 becomes "Yes". When the lapse time becomes equal to or larger than the communication waiting time, the control section 103 sets "Yes" as a result of the determination made at step SJ2.

At step SJ3, the control section 103 notifies the network manager about the occurrence of the trouble that affects the path P400, the link L500, and the service S600 shown in FIG. 36, via the display section 101 (refer to FIG. 36: (6)).

As explained above, according to the third embodiment, the service identifier concerning service is managed in the table 120$_7$ (refer to FIG. 32B) corresponding to the link and the path. The information about the link, the path, and the service is automatically updated following the change of the configuration. Therefore, the service can be provided, and the load of the network manager can be reduced.

Further, according to the third embodiment, as explained with reference to FIG. 29, when the communication service is being provided, the control section notifies the second NMS 60 about disapproval of changing the configuration (i.e., cancellation of the setting of the path). Therefore, the trouble of stopping the communication service following the change during the service can be avoided.

Further, according to the third embodiment, as explained with reference to FIG. 36, when the control section receives the notification of the occurrence of the trouble from the second NMS 60, the control section notifies the other first NMS 30 about the occurrence of the trouble. After a lapse of a predetermined time since the occurrence of the trouble, the control section also notifies the network manager about the occurrence of the trouble. Therefore, the load of the network manager can also be reduced about the notification about the trouble.

While the network systems according to the first to the third embodiments of the present invention are explained above in detail with reference to the drawings, detailed configuration examples are not limited to those of the first to the third embodiments. Any design alteration within a range not departing from the gist of the present invention is included in the present invention.

Figure 39:
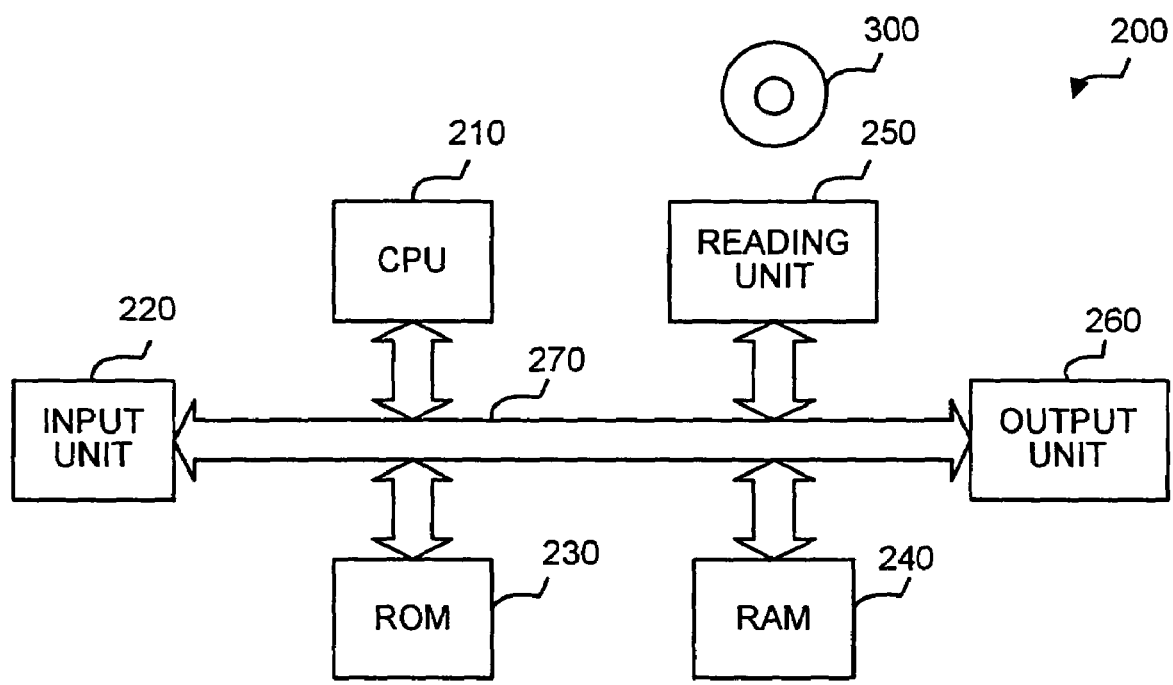
FIG. 39 is a block diagram of a modification of the systems according to the first to the third embodiments of the present invention.

For example, in the first to the third embodiments, a program that achieves the functions of the network layer link apparatus is recorded onto a computer-readable recording medium 300 shown in FIG. 39. A computer 200 shown in FIG. 39 executes the program recorded on this recording medium 300, thereby achieving each function.

The computer shown in FIG. 39 includes a central processing unit (CPU) 210 that executes the program, an input unit including a keyboard and a mouse, a read only memory (ROM) 230 that stores various data, a random access memory (RAM) 240 that stores operation parameters, a reading unit 250 that reads the program from the recording medium 300, an output unit 260 including a display and a printer, and a bus 270 that connects between the sections of the apparatus.

The CPU 210 reads the program that is recorded on the recording medium 300 via the reading unit 250, and executes the program, thereby achieving the above functions. The recording medium 300 includes an optical disk, a flexible disk, or a hard disk.

As explained above, according to the present invention, a relationship between first configuration information concerning the configuration of a first network layer and second configuration information concerning the configuration of a second network layer is managed. The first configuration information and the second configuration information are automatically updated following a change in the configuration. When one of the first network layer and the second network layer requires a change of the configuration, the other network layer that requires a change is instructed to change the configuration. Therefore, there is an effect that the load of the network manager can be reduced.

When a bandwidth is changed in the first network layer, a change instruction is issued to the second network layer concerning the change of the bandwidth. Therefore, there is an effect that the load of the network manager can be reduced following the change of the bandwidth.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium that stores a computer program that makes a computer function as:

storing a relationship between first configuration information concerning a configuration of a first network layer managed by a first management apparatus and second configuration information concerning a configuration of a second network layer managed by a second management apparatus in a storing unit, and automatically updating the first configuration information and the second configuration information following a change in the configuration; and instructing the second management apparatus to change the configuration of the second network layer based on the first configuration information and the second configuration information updated when a notification that notifies a change in the configuration of the first network layer is received from the first management apparatus.

2. The computer program according to claim 1, wherein when a bandwidth is changed in the first network layer, the instructing includes issuing a change instruction to the second network layer concerning the change of the bandwidth.

3. The computer program according to claim 1, wherein the second network layer consists of a plurality of layer elements, and the storing includes storing a relationship between the second configuration information and the first configuration information for each of the plurality of layer elements.

4. The computer program according to claim 1, wherein the storing includes storing service information concerning communication service provided from the first network layer and the second network layer, by relating the service information to the first configuration information and the second configuration information, and automatically updating the first configuration information, the second configuration information, and the service information following the change of the configuration.

5. The computer program according to claim 4, wherein when the communication service is being provided, the instructing includes notifying the network layer about disapproval of changing the configuration.

6. The computer program according to claim 1, further comprising receiving a notification of an occurrence of a trouble from the first network layer, wherein the instructing includes notifying the second network layer about the occurrence of the trouble.

7. The computer program according to claim 6, wherein the instructing includes notifying, upon lapse of a predetermined time since the occurrence of the trouble, a network manager about the occurrence of the trouble.

8. The computer program according to claim 1, wherein the first network layer is configured to have a link, and the second network layer is configured to have a path that is utilized in the link.

9. A network layer link apparatus comprising:

a managing unit that stores a relationship between first configuration information concerning a configuration of a first network layer managed by a first management apparatus and second configuration information concerning a configuration of a second network layer managed by a second management apparatus in a storing unit, and automatically updates the first configuration information and the second configuration information following a change in the configuration; and a link unit that instructs the management apparatus to change the configuration of the second network layer based on the first configuration information and the second configuration information updated when a notification that notifies a change in the configuration of the first network layer is received from the first management apparatus.

10. The network layer link apparatus according to claim 9, wherein when a bandwidth is changed in the first network layer, the link unit issues a change instruction to the second network layer concerning the change of the bandwidth.

11. The network layer link apparatus according to claim 9, wherein the second network layer consists of a plurality of layer elements, and the managing unit stores a relationship between the second configuration information and the first configuration information for each of the plurality of layer elements.

12. The network layer link apparatus according to claim 9, wherein
the managing unit stores service information concerning communication service provided from the first network layer and the second network layer, by relating the service information to the first configuration information and the second configuration information, and automatically updates the first configuration information, the second configuration information, and the service information following the change of the configuration.

13. The network layer link apparatus according to claim 12, wherein
when the communication service is being provided, the link unit notifies the network layer about disapproval of changing the configuration.

14. The network layer link apparatus according to claim 9, wherein
when the link unit receives a notification of an occurrence of a trouble from the first network layer, the link unit notifies the second network layer about the occurrence of the trouble.

15. The network layer link apparatus according to claim 14, wherein
after a lapse of a predetermined time since the occurrence of the trouble, the link unit notifies a network manager about the occurrence of the trouble.

16. The network layer link apparatus according to claim 9, wherein
the first network layer is configured to have a link, and the second network layer is configured to have a path that is utilized in the link.

17. A network layer link method comprising:
storing a relationship between first configuration information concerning a configuration of a first network layer managed by a first management apparatus and second configuration information concerning a configuration of a second network layer managed by a second management apparatus in a storing unit, and automatically updating the first configuration information and the second configuration information following a change in the configuration; and
instructing the second management apparatus to change the configuration of the second network layer based on the first configuration information and the second configuration information updated when a notification that notifies a change in the configuration of the first network layer is received from the first management apparatus.

18. The network layer link method according to claim 17, wherein
when a bandwidth is changed in the first network layer, the instructing includes issuing a change instruction to the second network layer concerning the change of the bandwidth.

19. The network layer link method according to claim 17, wherein
the second network layer consists of a plurality of layer elements, and the storing includes storing a relationship between the second configuration information and the first configuration information for each of the plurality of layer elements.

20. The network layer link method according to claim 17, wherein
the storing includes storing service information concerning communication service provided from the first network layer and the second network layer, by relating the service information to the first configuration information and the second configuration information, and automatically updating the first configuration information, the second configuration information, and the service information following the change of the configuration.

21. The network layer link method according to claim 20, wherein
when the communication service is being provided, the instructing includes notifying the network layer about disapproval of changing the configuration.

22. The network layer link method according to claim 17, further comprising receiving a notification of an occurrence of a trouble from the first network layer, wherein the instructing includes notifying the second network layer about the occurrence of the trouble.

23. The network layer link method according to claim 22, wherein
the instructing includes notifying, upon lapse of a predetermined time since the occurrence of the trouble, a network manager about the occurrence of the trouble.

24. The network layer link method according to claim 17, wherein
the first network layer is configured to have a link, and the second network layer is configured to have a path that is utilized in the link.

* * * * *